US012808780B2

(12) United States Patent
Michel et al.

(10) Patent No.: US 12,808,780 B2
(45) Date of Patent: Nov. 24, 2026

(54) DEVICE FOR IN SITU OBSERVATION OF SAMPLE UNDER TEST

(71) Applicant: VIRGINIA TECH INTELLECTUAL PROPERTIES, INC., Blacksburg, VA (US)

(72) Inventors: F. Marc Michel, Blacksburg, VA (US); Alexander S. Brand, Blacksburg, VA (US); Yizheng Zhu, Blacksburg, VA (US); Ebenezer O. Fanijo, Blacksburg, VA (US); Joseph G. Thomas, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 18/848,558

(22) PCT Filed: Mar. 21, 2023

(86) PCT No.: PCT/US2023/015781
§ 371 (c)(1),
(2) Date: Sep. 19, 2024

(87) PCT Pub. No.: WO2023/183306
PCT Pub. Date: Sep. 28, 2023

(65) Prior Publication Data

US 2025/0208029 A1 Jun. 26, 2025

Related U.S. Application Data

(60) Provisional application No. 63/322,125, filed on Mar. 21, 2022.

(51) Int. Cl.
*G01N 21/03* (2006.01)
*G01N 21/05* (2006.01)

(52) U.S. Cl.
CPC ..... *G01N 21/05* (2013.01); *G01N 2021/0389* (2013.01); *G01N 2021/054* (2013.01)

(58) Field of Classification Search
CPC ........... G01N 21/05; G01N 2021/0389; G01N 2021/054; G01N 17/002; G01N 21/453; G02B 21/34
(Continued)

(56) References Cited

U.S. PATENT DOCUMENTS

2003/0146091 A1 8/2003 Vogel et al.
2007/0085997 A1* 4/2007 Thomas ............... G01N 21/645 356/72

(Continued)

OTHER PUBLICATIONS

Brand, et al., "Phase Uncertainty in Digital Holographic Microscopy Measurements in the Presence of Solution Flow Conditions", J Res Natl Inst Stand Technol. 2017; 122: 1-41, 2017.

(Continued)

*Primary Examiner* — Isiaka O Akanbi
(74) *Attorney, Agent, or Firm* — John S. Sears; Lex Generalis, LLC

(57) ABSTRACT

A device may include a chamber wall defining in part a fluid chamber, a fluid inlet, a fluid outlet, and an electrode opening for receiving an electrode. A device may include a platform, at least a portion of which is positioned within the fluid chamber, the platform having a first surface for positioning a sample. A device may include a moveable transparent window positioned opposite the platform, the moveable window configured to move towards or away from the first surface of the platform, the moveable window defining in part the fluid chamber.

20 Claims, 7 Drawing Sheets

(58) Field of Classification Search
USPC .......................................................... 356/246
See application file for complete search history.

(56) References Cited

U.S. PATENT DOCUMENTS

| | | | | |
|---|---|---|---|---|
| 2010/0039709 | A1 | 2/2010 | Lo | |
| 2010/0290041 | A1* | 11/2010 | Graham | C03B 23/0476 356/246 |
| 2013/0029407 | A1* | 1/2013 | Terazono | C12N 1/066 435/287.2 |
| 2014/0071452 | A1 | 3/2014 | Fleischer | |
| 2014/0315288 | A1* | 10/2014 | Miyamura | G01N 33/5094 29/428 |
| 2015/0079598 | A1* | 3/2015 | Yasuda | B01L 7/52 435/6.12 |
| 2015/0148609 | A1 | 5/2015 | Ladet et al. | |
| 2016/0011098 | A1* | 1/2016 | Graham | G01N 21/05 156/196 |
| 2016/0051719 | A1* | 2/2016 | Watanabe | A61L 9/205 422/121 |
| 2017/0115196 | A1* | 4/2017 | Tsuboi | G01N 15/1459 |
| 2018/0265918 | A1* | 9/2018 | Shirai | C40B 40/08 |
| 2020/0006043 | A1* | 1/2020 | Ugarov | H01J 49/004 |

OTHER PUBLICATIONS

Fanijo, et al., "Quantitative measurement of corrosion at the nanoscale by in situ spectral modulation interferometry", Materials Characterization, 189, 2022, 35 pages.
Abbott A.P. et al., "In Situ Electrochemical Digital Holographic Microscopy; A Study of Metal Electrodeposition in Deep Eutectic Solvents," Anal. Chem., vol. 85 2013.
Agrawal P. et al., "The Contribution of Hydrodynamic Processes to Calcite Dissolution Rates and Rate Spectra," Geochim. Cosmochim. Acta, vol. 307 2021.
Almuaili F.A. et al., "Application of a Quasi In Situ Experimental Approach to Estimate 3-D Pitting Corrosion Kinetics in Stainless Steel," J. Electrochem. Soc, vol. 163 2016.
Altenpohl D. and Kaufman J.G., "Aluminum: Technology, Applications, and Environment: A Profile of a Modern Metal," 6th ed., Aluminum Association; Minerals, Metals & Materials Society, 2017.
APHA AWWA WEF, "Standard Methods for the Examination of Water and Wastewater," 20th ed., American Public Health Association, Washington, DC, 1998.
Asgari P. et al., "Digital Holographic Microscopy as a New Technique for Quantitative Measurement of Microstructural Corrosion in Austenitic Stainless Steel," Mater. Des., vol. 125 2017.
Bibi I. et al., "Temporal Evolution of Calcite Surface Dissolution Kinetics," Minerals, vol. 8 2018.
Bollermann T. and Fischer C., "Temporal Evolution of Dissolution Kinetics of Polycrystalline Calcite," Am. J. Sci., vol. 320, 2020.
Brand A.S. and Bullard J.W., "Dissolution Kinetics of Cubic Tricalcium Aluminate Measured by Digital Holographic Microscopy," Langmuir, vol. 33, 2017.
Brand A.S. et al., "Calcite Dissolution Rate Spectra Measured by In Situ Digital Holographic Microscopy," Geochim. Cosmochim. Acta, vol. 213 2017.
Brand A.S. et al., "Dissolution and Initial Hydration Behavior of Tricalcium Aluminate in Low Activity Sulfate Solutions," Cem. Concr. Res., vol. 130 2020.
Brand A.S. et al., "Dissolution Rate Spectra of B-Dicalcium Silicate in Water of Varying Activity," Cem. Concr. Res., vol. 118 2019.
Brand A.S., "Phase Uncertainty in Digital Holographic Microscopy Measurements in the Presence of Solution Flow Conditions," J. Res. Natl. Inst. Stand. Technol., vol. 122, 2017.
Brasiliense V. et al., "Electrochemistry of Single Nanodomains Revealed by Three-Dimensional Holographic Microscopy," Acc. Chem. Res., vol. 49 2016.
Brunner J.G. et al., "Impact of Ultrafine-Grained Microstructure on the Corrosion of Aluminium Alloy AA2024," Corros. Sci., vol. 57 2012.
Brunner J.G. et al., "Localized Corrosion of Ultrafine-Grained Al—Mg Model Alloys," Electrochim. Acta, vol. 55 2010.
Chen H. et al., "Application of Electrochemical Atomic Force Microscopy (EC-AFM) in the Corrosion Study of Metallic Materials," Materials, vol. 13 2020.
Contreras E.Q. et al., "Optical Measurement of Uniform and Localized Corrosion of C1018, SS 410, and Inconel 825 Alloys Using White Light Interferometry," Corros. Sci., vol. 87 2014.
Díaz-Benito B. et al., "AFM Study of Steel Corrosion in Aqueous Solutions in Concrete," Mater. Construcción, vol. 61 2011.
Fanijo E. and Brand A., "Initiation of Chloride-Induced Corrosion of Low Carbon Steel Rebar in Concrete Using In-Situ Quantitative Phase Microscopy," 2021.
Dong S. et al., "Elucidating the Grain-Orientation Dependent Corrosion Rates of Austenitic Stainless Steels," Mater. Des., vol. 191 2020.
Fanijo E.O. and Brand A.S., "Anti-Corrosion Behaviors of Corn-Based Polyols on Low Carbon Steel Rebar," Clean. Mater 2022.
Fargas G. et al., "Effect of the Annealing Temperature on the Mechanical Properties, Formability and Corrosion Resistance of Hot-Rolled Duplex Stainless Steel," J. Mater. Process. Technol., vol. 209 2009.
Feng P. et al., "In Situ Nanoscale Observations of Gypsum Dissolution by Digital Holographic Microscopy," Chem. Geol., vol. 460 2017.
Fischer C. and Luttge A., "Beyond the Conventional Understanding of Water-Rock Reactivity," Earth Planet. Sci. Lett., vol. 457 2017.
Fischer C. and Luttge A., "Pulsating Dissolution of Crystalline Matter," Proc. Natl. Acad. Sci., vol. 115 2018.
Fischer C. et al., "Direct Measurement of Surface Dissolution Rates in Potential Nuclear Waste Forms: The Example of Pyrochlore," ACS Appl. Mater. Interfaces, vol. 7 2015.
Fischer C. et al., "How Predictable Are Dissolution Rates of Crystalline Material?," Geochim. Cosmochim. Acta, vol. 98 2012.
Fischer C. et al., "Inherited Control of Crystal Surface Reactivity," Appl. Geochemistry, vol. 91 2018.
Fischer C. et al., "Variability of Crystal Surface Reactivity: What Do We Know?," Appl. Geochemistry, vol. 43 2014.
Fortin P.E. et al., "An Optimized Aluminum Alloy (x6111) for Auto Body Sheet Applications," SAE Technical Paper 1983.
Francia S.R. and Llanos J.C.Y., "Materiales: La Corrosión, Su Tradición y Alcances," Rev. Del Inst. Investig. La Fac. Ing. Geológica, Minera, Met. y Geográfica, vol. 6 2003.
Froehly L. et al., "Multiplexed 3D Imaging Using Wavelength Encoded Spectral Interferometry: A Proof of Principle," Opt. Commun., vol. 222 2003.
Gao G. et al., "The Anodic Dissolution Processes of Copper in Sodium Fluoride Solution," Int. J. Electrochem. Sci., vol. 9, 2014.
Gharbi O. et al., "On the Corrosion of Additively Manufactured Aluminium Alloy AA2024 Prepared by Selective Laser Melting," Corros. Sci., vol. 143 2018.
Ghahari S.M. et al., "In Situ Synchrotron X-Ray Micro-Tomography Study of Pitting Corrosion in Stainless Steel," Corros. Sci., vol. 53 2011.
Golan L. et al., "High-Speed Interferometric Spectrally Encoded Flow Cytometry," Opt. Lett., vol. 37 2012.
Guo P. et al., "Direct Observation of Pitting Corrosion Evolutions on Carbon Steel Surfaces at the Nano-to-Micro-Scales," Sci. Rep., vol. 8 2018.
Gupta A.K. et al., "Study of the Precipitation Kinetics in a 6000 Series Automotive Sheet Material," Mater. Sci. Forum, Trans Tech Publ 1996.
Gutmann B. and Weber H., "Phase Unwrapping with the Branch-Cut Method: Role of Phase-Field Direction," Appl. Opt., vol. 39 2000.
Hashimoto T. et al., "Investigation of Dealloying of S Phase (Al2CuMg) in AA 2024-T3 Aluminium Alloy Using High Resolution 2D and 3D Electron Imaging," Corros. Sci., vol. 103 2016.

(56) References Cited

OTHER PUBLICATIONS

Hector L.G. et al., "Texture Characterization of Autogenous Nd: YAG Laser Welds in AA5182-O and AA6111-T4 Aluminum Alloys," Metall. Mater. Trans. A, vol. 35 2004.
Heuer J. and Luttge A., "Kinetics of Pipeline Steel Corrosion Studied by Raman Spectroscopy-Coupled Vertical Scanning Interferometry," npj Mater. Degrad., vol. 2 2018.
Homazava N. et al., "Micro-Capillary System Coupled to ICP-MS as a Novel Technique for Investigation of Micro-Corrosion Processes," J. Anal. At. Spectrom., vol. 22 2007.
Hu Y. et al., "Investigation into the Anodic Dissolution Processes of Copper in Neutral and Acidic Sulfate Solutions with the In-Line Digital Holography," Electrochemistry, vol. 84 2016.
Jiang J. et al., "Galvanic Corrosion of Duplex Corrosion-Resistant Steel Rebars under Carbonated Concrete Conditions," RSC Adv., vol. 8 2018.
Jiang J. et al., "Pitting Corrosion Behaviour of New Corrosion-Resistant Reinforcement Bars in Chloride-Containing Concrete Pore Solution," Materials, vol. 10, 2017.
Khobragade N.N. et al., "Corrosion Behaviour of Chrome-Manganese Austenitic Stainless Steels and AISI 304 Stainless Steel in Chloride Environment," Trans. Indian Inst. Met., vol. 67 2014.
Kim M.K., Digital Holographic Microscopy, Springer, New York, NY 2011.
Kletetschka K. et al., "Suitability of 3D-Printed Devices for Low-Temperature Geochemical Experiments," Appl. Geochemistry, vol. 98 2018.
Koch G. et al., "International Measures of Prevention, Application, and Economics of Corrosion Technologies Study," NACE International, Houston, TX 2016.
Koch G.H. et al., Corrosion Cost and Preventive Strategies in the United States, United States Federal Highway Administration 2002.
Kosari A. et al., "In-Situ Nanoscopic Observations of Dealloying-Driven Local Corrosion from Surface Initiation to In-Depth Propagation," Corros. Sci., vol. 177 2020.
Kosari A. et al., "Nanoscopic and In-Situ Cross-Sectional Observations of Li-Based Conversion Coating Formation Using Liquid-Phase TEM," npj Mater. Degrad., vol. 5 2021.
Laitinen T., "Localized Corrosion of Stainless Steel in Chloride, Sulfate and Thiosulfate Containing Environments," Corros. Sci., vol. 42 2000.
Lalisse A. et al., "Quantitative Temperature Measurements in Gold Nanorods Using Digital Holography," ACS Appl. Mater. Interfaces, vol. 13 2021.
Li L. et al., "An Investigation on General Corrosion and Pitting of Iron with the In-Line Digital Holography," Electrochim. Acta, vol. 53 2008.
Luttge A. and Arvidson R.S., "Reactions at Surfaces: A New Approach Integrating Interferometry and Kinetic Simulations," J. Am. Ceram. Soc, vol. 93 2010.
Ma A. et al., "Understanding Crystallographic Orientation Dependent Dissolution Rates of 90Cu-10Ni Alloy: New Insights Based on AFM/SKPFM Measurements and Coordination Number/Electronic Structure Calculations," Corros. Sci., vol. 164 2020.
Mariano N.A. and Spinelli D., "Stress Corrosion Cracking of Stainless Steel Used in Drill Collars," Mater. Sci. Eng. A, vol. 385 2004.
Michel F.M. et al., "3D Printed Mixed Flow Reactor for Geochemical Rate Measurements," Appl. Geochemistry, vol. 89 2018.
Mir M. et al., "Quantitative Phase Imaging," in E. Wolf (Ed.), Prog. Opt., Elsevier 2012.
Ogle K. and Weber S., "Anodic Dissolution of 304 Stainless Steel Using Atomic Emission Spectroelectrochemistry," J. Electrochem. Soc, vol. 147 2000.
Ogle K., "Atomic Emission Spectroelectrochemistry: Real-Time Rate Measurements of Dissolution, Corrosion, and Passivation," Corrosion, vol. 75 2019.
Orlikowski J. et al., "Determination of Pitting Corrosion Stage of Stainless Steel by Galvanodynamic Impedance Spectroscopy," Electrochim. Acta, vol. 253 2017.
Keheyan Y. et al., "Micro-Stratigraphical Investigation on Corrosion Layers in Ancient Bronze Artefacts by Scanning Electron Microscopy Energy Dispersive Spectrometry and Optical Microscopy," Herit. Sci., vol. 1 2013.
Oudbashi O., "Multianalytical Study of Corrosion Layers in Some Archaeological Copper Alloy Artefacts," Surf. Interface Anal., vol. 47 2015.
Pedram O. et al., "Development of an Accelerated Test for Pitting Corrosion of Custom 450 by rDHM," Int. J. Mater. Res., vol. 112 2021.
Pedrosa E.T. et al., "A Statistical Approach for Analysis of Dissolution Rates Including Surface Morphology," Minerals, vol. 9 2019.
Pourvais Y. et al., "Microstructural Surface Characterization of Stainless and Plain Carbon Steel Using Digital Holographic Microscopy," J. Opt. Soc. Am. B, vol. 34 2017.
Poursaeidi E. et al., "Experimental Investigation on Erosion Performance and Wear Factors of Custom 450 Steel as the First Row Blade Material of an Axial Compressor," Int. J. Surf. Sci. Eng., vol. 11 2017.
Poursaeidi E. et al., "Experimental Studies of Erosion and Corrosion Interaction in an Axial Compressor First Stage Rotating Blade Material," Appl. Phys. A, vol. 124 2018.
Ralston K.D. et al., "Role of Nanostructure in Pitting of Al—Cu—Mg Alloys," Electrochim. Acta, vol. 55 2010.
Rizzo R. et al., "An Electrochemical and X-Ray Computed Tomography Investigation of the Effect of Temperature on CO2 Corrosion of 1Cr Carbon Steel," Corros. Sci., vol. 166 2020.
Rodrigues R. et al., "Reinforced Concrete Structures: A Review of Corrosion Mechanisms and Advances in Electrical Methods for Corrosion Monitoring," Constr. Build. Mater 2020.
Salgado J.A.M. et al., "Quantification of Corrosion Products Formation onto a Copper Sample by Digital Holographic Microscopy," Appl. Phys. Lett., vol. 11 2013.
Sánchez J. et al., "AFM Study of the Early Corrosion of a High Strength Steel in a Diluted Sodium Chloride Solution," Corros. Sci., vol. 50 2008.
Shang R. et al., "Spectral Modulation Interferometry for Quantitative Phase Imaging," Biomed. Opt. Express, vol. 6 2015.
Shi X. et al., "Atomic Force Microscopy-Scanning Electrochemical Microscopy (AFM-SECM) for Nanoscale Topographical and Electrochemical Characterization: Principles, Applications and Perspectives," Electrochim. Acta, vol. 332 2020.
Singaravelu A.S.S. et al., "3D Time-Resolved Observations of Fatigue Crack Initiation and Growth from Corrosion Pits in Al 7XXX Alloys Using In Situ Synchrotron X-Ray Tomography," Metall. Mater. Trans. A, vol. 51 2020.
Svenningsen G. et al., "Effect of Artificial Aging on Intergranular Corrosion of Extruded AlMgSi Alloy with Small Cu Content," Corros. Sci., vol. 48 2006.
Tearney G.J. et al., "Spectrally Encoded Confocal Microscopy," Opt. Lett., vol. 23 1998.
Thomas B.G. et al., "Thermec '97," Int. Conf on Thermomechanical Processing of Steel and Other Materials, vol. 2, 1997.
Torbati-Sarraf H. et al., "Direct Observations of Microstructure-Resolved Corrosion Initiation in AA7075-T651 at the Nanoscale Using Vertical Scanning Interferometry (VSI)," Mater. Charact., vol. 161 2020.
Vasilescu C. et al., "Surface Analysis, Microstructural, Mechanical and Electrochemical Properties of New Ti-15Ta-5Zr Alloy," Met. Mater. Int., vol. 21 2015.
Wang C. et al., "In Situ Monitoring of the Localized Corrosion of 304 Stainless Steel in FeCl3 Solution Using a Joint Electrochemical Noise and Scanning Reference Electrode Technique," Electrochem. Commun., vol. 90 2018.
Wang L. et al., "Digital Holographic Reconstruction Detection of Localized Corrosion Arising from Scratches," J. Serbian Chem. Soc, vol. 75 2010.
Yasakau K., "Application of AFM-Based Techniques in Studies of Corrosion and Corrosion Inhibition of Metallic Alloys," Corros. Mater. Degrad., vol. 1 2020.
Ye S. et al., "Dissolution and Early Hydration of Tricalcium Aluminate in Aqueous Sulfate Solutions," Cem. Concr. Res., vol. 137 2020.

(56) References Cited

OTHER PUBLICATIONS

Ye S. et al., "In Situ Nano-Scale Observation of C3A Dissolution in Water," Cem. Concr. Res., vol. 132 2020.
Yelin D. et al., "Spectral-Domain Spectrally-Encoded Endoscopy," Opt. Express, vol. 15 2007.
Yuan B. et al., "Real Time Observation of the Anodic Dissolution of Copper in NaCI Solution with the Digital Holography," Electrochem. Commun., vol. 11 2009.
Zhang B. and Ma X.L., "A Review—Pitting Corrosion Initiation Investigated by Tem," J. Mater. Sci. Technol., vol. 35 2019.
Zhang B. et al., "Unmasking Chloride Attack on the Passive Film of Metals," Nat. Commun., vol. 9 2018.
Zhang M. et al., "Study of the Effects of the Magnetic Field on the Anodic Dissolution of Nickel with In-Line Digital Holography," Int. J. Electrochem. Sci., vol. 13 2018.
Zhang X. et al., "Localized Corrosion in AA2024-T351 Aluminium Alloy: Transition from Intergranular Corrosion to Crystallographic Pitting," Mater. Charact., vol. 130 2017.
Li X. et al., "Multiscale Investigation of Olivine (010) Face Dissolution from a Surface Control Perspective," Appl. Surf. Sci., vol. 549 2021.

* cited by examiner

DEVICE FOR IN SITU OBSERVATION OF SAMPLE UNDER TEST

CROSS-REFERENCE TO RELATED APPLICATIONS

This application is the 35 U.S.C. § 371 national stage application of PCT Application No. PCT/US2023/015781, filed Mar. 21, 2023, which claims priority to U.S. Provisional Patent Application No. 63/322,125, entitled "Device for in situ electrochemical studies of solid-liquid interface using microscopy," filed Mar. 21, 2022, the entirety of which is incorporated by reference herein.

STATEMENT REGARDING FEDERALLY SPONSORED RESEARCH

This invention was made with government support under Grant No. 1652237 awarded by National Science Foundation. The government has certain rights in the invention.

TECHNICAL FIELD

This disclosure relates to devices for observation of samples under test.

DESCRIPTION OF THE RELATED TECHNOLOGY

Some approaches to characterizing physical properties of samples include optical microscopy, X-ray diffraction (XRD), scanning electron microscopy (SEM), transmission electron microscopy (TEM), in situ liquid TEM, X-ray computed tomography, atomic force microscopy (AFM), scanning Kelvin probe force microscopy (SKPFM), electrochemical atomic force microscopy (EC-AFM), vertical scanning interferometry (VSI), and digital holography and digital holographic microscopy (DHM). Some of these approaches can generate high-resolution surface topography of the sample to aid in monitoring the surface profile of the sample over time. In particular, the surface topography can aid in characterizing the properties of the sample under various conditions such as, for example, corrosion.

SUMMARY

In some aspects, the techniques described herein relate to a fluid cell, including: a chamber wall defining in part a fluid chamber, a fluid inlet, a fluid outlet, and an electrode opening for receiving an electrode: a platform, at least a portion of which is positioned within the fluid chamber, the platform having a first surface for positioning a sample; and a moveable transparent window positioned opposite the platform, the moveable window configured to move towards or away from the first surface of the platform, the moveable window defining in part the fluid chamber.

In some aspects, the techniques described herein relate to a fluid cell, the chamber wall further defining a camera opening for accommodating a camera.

In some aspects, the techniques described herein relate to a fluid cell, wherein the fluid inlet is positioned opposite the fluid outlet.

In some aspects, the techniques described herein relate to a fluid cell, wherein the platform is positioned between the fluid inlet and the fluid outlet.

In some aspects, the techniques described herein relate to a fluid cell, further including: an inlet channel, one end of which terminates at the fluid inlet; and an outlet channel, one end of which terminates at the fluid outlet.

In some aspects, the techniques described herein relate to a fluid cell, wherein the moveable optical window includes a transparent flexible film.

In some aspects, the techniques described herein relate to a fluid cell, wherein the transparent flexible film includes a polymer film.

In some aspects, the techniques described herein relate to a fluid cell, wherein the transparent flexible film is coupled with a periphery of the chamber wall.

In some aspects, the techniques described herein relate to a fluid cell, wherein the moveable optical window includes a rigid portion and a flexible portion coupled with the rigid portion.

In some aspects, the techniques described herein relate to a fluid cell, wherein the flexible portion is coupled with a periphery of the chamber wall.

In some aspects, the techniques described herein relate to a fluid cell, wherein the moveable transparent window moves towards or away from the first surface of the platform responsive to a force imparted by an objective lens housing.

In some aspects, the techniques described herein relate to a fluid cell, wherein the objective lens is part of a spectral modulation interferometry setup.

In some aspects, the techniques described herein relate to a fluid cell, wherein the moveable transparent window has a refractive index that is within about 1-15% of a refractive index of a fluid within the fluid chamber.

In some aspects, the techniques described herein relate to a fluid cell, further including: an electrode channel, one end of which terminates at the electrode opening.

In some aspects, the techniques described herein relate to a fluid cell, wherein the electrode opening is a first electrode opening, the electrode is a first electrode, and the electrode channel is first electrode channel, the fluid cell further including: the chamber wall further defining a second electrode opening for receiving a second electrode; and a second electrode channel, one end of which terminates at the second electrode opening.

In some aspects, the techniques described herein relate to a fluid cell, wherein the platform includes resin.

In some aspects, the techniques described herein relate to a fluid cell, further including: a vibration motor positioned on a second surface of the platform, the second surface of the platform positioned outside of the fluid chamber.

In some aspects, the techniques described herein relate to a fluid cell, wherein the platform includes a conduit that accommodates a sample electrode electrically coupled with the sample.

In some aspects, the techniques described herein relate to a fluid cell, including: a chamber wall defining in part a fluid chamber, a fluid inlet and a fluid outlet: a platform, at least a portion of which is positioned within the fluid chamber, the platform having a first surface for positioning a sample; and a moveable transparent window positioned opposite the platform, the moveable window configured to move towards or away from the first surface of the platform, the moveable window defining in part the fluid chamber.

In some aspects, the techniques described herein relate to a fluid cell, the chamber wall further defining a camera opening for accommodating a camera.

In some aspects, the techniques described herein relate to a fluid cell, wherein the fluid inlet is positioned opposite the fluid outlet.

In some aspects, the techniques described herein relate to a fluid cell, wherein the platform is positioned between the fluid inlet and the fluid outlet.

In some aspects, the techniques described herein relate to a fluid cell, further including: an inlet channel, one end of which terminates at the fluid inlet; and an outlet channel, one end of which terminates at the fluid outlet.

In some aspects, the techniques described herein relate to a fluid cell, wherein the moveable optical window includes a transparent flexible film.

In some aspects, the techniques described herein relate to a fluid cell, wherein the transparent flexible film includes a polymer film.

In some aspects, the techniques described herein relate to a fluid cell, wherein the transparent flexible film is coupled with a periphery of the chamber wall.

In some aspects, the techniques described herein relate to a fluid cell, wherein the moveable optical window includes a rigid portion and a flexible portion coupled with the rigid portion.

In some aspects, the techniques described herein relate to a fluid cell, wherein the flexible portion is coupled with a periphery of the chamber wall.

In some aspects, the techniques described herein relate to a fluid cell, wherein the moveable transparent window moves towards or away from the first surface of the platform responsive to a force imparted by an objective lens housing.

In some aspects, the techniques described herein relate to a fluid cell, wherein the objective lens is part of a spectral modulation interferometry setup.

In some aspects, the techniques described herein relate to a fluid cell, wherein the moveable transparent window has a refractive index that is within about 1-15% of a refractive index of a fluid within the fluid chamber.

BRIEF DESCRIPTION OF THE DRAWINGS

Like reference numbers and designations in the various drawings indicate like elements.

DETAILED DESCRIPTION

Figure 1:
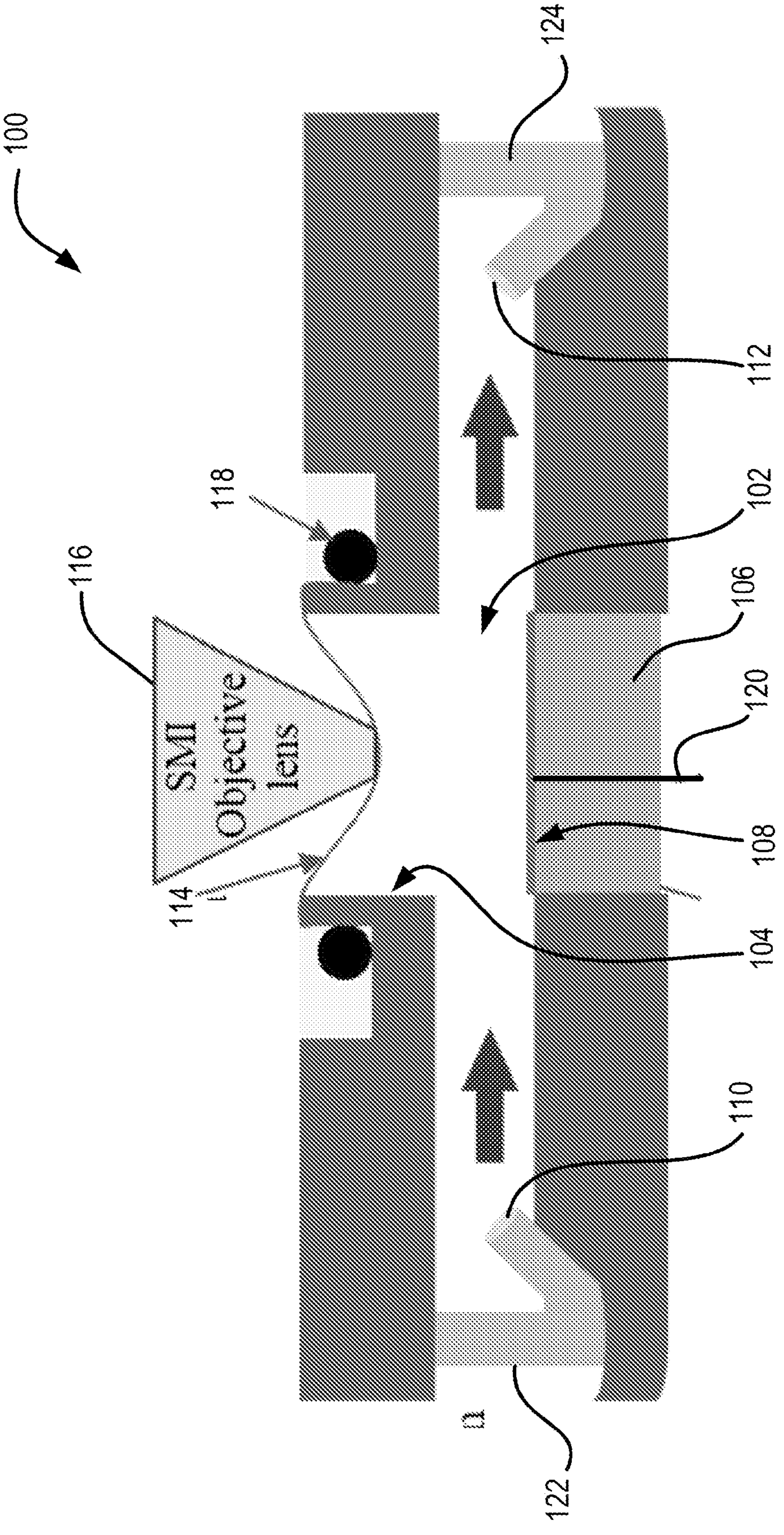
FIG. 1 shows a cross-sectional view of a depiction of a first example device for in situ examination of a sample under test.

The various concepts introduced above and discussed in greater detail below may be implemented in any of numerous ways, as the described concepts are not limited to any particular manner of implementation. Examples of specific implementations and applications are provided primarily for illustrative purposes.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list.

As used in the specification and the appended claims, the singular forms "a," "an" and "the" include plural referents unless the context clearly dictates otherwise. Thus, for example, reference to "a proton beam degrader," "a degrader foil," or "a conduit," includes, but is not limited to, two or more such proton beam degraders, degrader foils, or conduits, and the like.

The various concepts introduced above and discussed in greater detail below may be implemented in any of numerous ways, as the described concepts are not limited to any particular manner of implementation. Examples of specific implementations and applications are provided primarily for illustrative purposes.

As used herein, the terms "optional" or "optionally" means that the subsequently described event or circumstance can or cannot occur, and that the description includes instances where said event or circumstance occurs and instances where it does not. Unless otherwise specified, temperatures referred to herein are based on atmospheric pressure (i.e., one atmosphere).

Several physical phenomenon affecting materials can be investigated by examining changes in the material at the micro or nano scale. Corrosion is one such physical phenomenon where knowledge of the micro or nano scale changes in the material can inform the understanding of the macroscopic behavior of the material. Optical probe quantitative phase microscopy (QPM) methods such as VSI, and DHM, are capable of generating high-resolution 3D surface topography data and computing rate kinetics based on changes in the surface profile of the sample over time. These methods also have such advantages as high axial resolution, full-field view, nondestructive observation, contact-free high sensitivity, and fast response. In particular, methods such as VSI and DHM are useful in quantifying dissolution kinetics. While these techniques have been used for dissolution and corrosion studies, there is still a lack of approaches for high-quality kinetic data that would derive fundamental mechanisms of metallic corrosion and the micro and nano scales.

The apparatus and methods discussed here provide novel application of a QPM approach, spectral modulation interferometry (SMI), to in situ study of samples. In addition, the apparatus and methods allow combining electrochemical testing and solution chemical analysis of the sample simultaneously with the SMI.

FIG. 1 shows a cross-sectional view of a depiction of a first example device 100 for in situ examination of a sample under test. The first example device 100 includes a fluid chamber 102 defined, in part, by a chamber wall 104 and a platform 106, over which a sample 108 can be positioned. The first example device 100 further includes a fluid inlet 110 and a fluid outlet 112 from the fluid chamber 102. In addition, an electrode 120 is coupled with the sample 108. the first example device 100 further includes a moveable transparent window 114 positioned opposite the platform 106. One side of the moveable transparent window 114 faces the sample 108 and in part defines the fluid chamber 102. An opposite side of the moveable transparent window 114 interfaces with an objective lens 116. The objective lens 116 can move towards or away from the sample 108, as well as move laterally. The flexibility of the moveable transparent window 114 can allow the objective lens 116 move in the desired direction. In one approach, as shown in FIG. 1, the moveable transparent window 114 can be coupled with a periphery of the chamber wall 104 using an O-ring 118. In some other approaches, the moveable transparent window 114 can be coupled with the periphery of the 104 using, for example, clamps, adhesive, or other fasteners. A working electrode 120 is electrically coupled with the sample 108. In the example shown in FIG. 1, the platform 106 can include a conduit through which the electrode 120 passes to couple with the sample 108. In some other examples, the electrode 120 may pass through any surface of first example device 100 to make contact with the sample 108. In some instances, where the first example device 100 is not utilized for electrochemical testing of the sample 108, the first example device 100 may be devoid of the electrode 120. On the other hand, the first example device 100 can accommodate one or more additional electrodes to facilitate electrochemical testing of the sample 108.

In some instances, the first example device 100 can further include a camera opening to accommodate a camera. As an example, the camera opening can be positioned in the chamber wall 104 to allow the camera to point towards the sample 108 and to monitor the conditions on and around the sample 108 during testing.

In the example shown in FIG. 1, the fluid inlet 110 and the fluid outlet 112 are positioned opposite each other. In some examples, the fluid inlet 110 and the fluid outlet 112 can be positioned along an axis of the first example device 100, where the axis, for example, can pass through the center of the first example device 100. In some examples, the platform 106 and the sample 108 can be positioned between the fluid inlet 110 and the fluid outlet 112. That is, the platform 106 and the sample 108 can be positioned downstream of the fluid inlet 110 and upstream of the fluid outlet 112 in a direction of flow of the fluid.

The first example device 100 can include an inlet channel 122, one end of which terminates at the fluid inlet 110, and an outlet channel 124, one end of which terminates at the fluid outlet 112. A second end (not shown) of the inlet channel 122 can be coupled with a fluid source such as a fluid pump that supplies fluid at a certain pressure and flow rate to the inlet channel 122. In some instances, the fluid flow rate through the first example device 100 can be about 20 ml/min. to about 60 ml/min, however the flow rate can be a function of the test being carried out as well as the properties of the sample under test (e.g., the volume and rate at which the sample produces bubbles or debris). A second end (not shown) of the outlet channel 124 can be coupled with fluid sink, where, in some examples, can collect samples of the fluid for solution chemistry analysis.

The moveable transparent window 114 can include a transparent flexible film. In some examples, the transparent flexible film can include a polymer film. In some examples, the transparent flexible film can include polyethylene terephthalate film, polyvinyl chloride film, polypropylene film, polycarbonate film, ethylene vinyl acetate film, etc.

In some examples, the moveable transparent window 114 can include a combination of a flexible film and a rigid transparent portion. For example, a portion of the moveable transparent window 114 that is positioned directly under the objective lens 116 can be a rigid transparent material such as glass or polymer. The remainder of the moveable transparent window 114 can be a flexible film, which may or may not be transparent. The movement of the objective lens 116 towards the platform 106 can push the rigid transparent portion of the moveable transparent window 114 towards the platform 106 as well. The flexible film coupled with the rigid transparent portion can provide resistance against the force imparted by the objective lens 116 while pushing down on the rigid portion. When the objective lens 116 moves away from the platform 106, the flexible portion can pull the rigid portion along with the objective lens 116.

The tension in the moveable transparent window 114, whether made entirely of the flexible transparent film, or of a combination of the rigid portion and the flexible portion, can be configured to ensure that the moveable transparent window 114 remains in contact with the objective lens 116 during operation. In some instances, the objective lens 116 can be during operation when the SMI process is underway. That is, the moveable transparent window 114 can be in contact with the objective lens 116 in any position where the SMI is being carried out.

The moveable transparent window 114 can be designed such that the portion of the moveable transparent window 114 that, on one side, is in contact with the objective lens 116 can also, on the other side, be in contact with the fluid within the fluid chamber 102 during operation. Generally the fluid level in the fluid chamber 102 can be a function of at least one of the pressure and the flow rate of the fluid flowing through the fluid inlet 110 and the fluid outlet 112. The pressure and/or the flow rate can be selected such that the fluid level reaches at least the portion of the moveable transparent window 114 that is in contact with the objective lens 116.

In some instances, the moveable transparent window 114 can have a refractive index that is substantially similar to the refractive index of the fluid that flows through the fluid chamber 102. Having substantially similar refractive indices can reduce the degree of refraction that the light emitted from and entering the objective lens 116 undergoes while passing through the interface between the moveable transparent window 114 and the fluid. In some examples, the refractive index of the portion of the moveable transparent window 114 through which light from the objective lens 116 passes can be within 1-15% of the refractive index of the fluid. In some instances, a fluid film can be maintained at the interface between the moveable transparent window 114 and the objective lens 116 to further reduce the degree of refraction. The fluid film can be, for example, drop of liquid (with substantially the same refractive index as the moveable transparent window 114) that is dropped over the moveable transparent window 114 at the position where the objective lens 116 makes contact.

In some instances, the first example device 100 can include one or more apertures to accommodate one or more electrodes. For example, the first example device 100 can include a first electrode opening to accommodate a first electrode. The first electrode can be used in electrochemical analysis of the sample. In some instances, the first example device 100 can accommodate additional electrodes via existing or additional electrode openings. One or more electrode channels can be formed within the body of the first example device 100 such as, for example, in the chamber wall 104. The electrode channels can have one end that terminate into the electrode openings. The electrode openings can open into the fluid chamber 102 to allow the electrodes to be positioned near the platform 106 and/or the sample 108.

In some instances, the platform 106 can be made of a resin such as, for example, epoxy, polyurethane resin, silicone resin, polypropylene resin, etc. In some instances, where the corrosion characteristics of the sample 108 are being tested, the platform 106 may be made of a non-metallic substance, such as the resins mentioned above, or other non-metallic and non-conductive materials.

In some instances, the first example device 100 can include a vibration motor (not shown) positioned in contact with the platform 106. The vibration motor can be used to vibrate the platform 106, and in turn the sample 108, to dislodge any bubbles, debris, or unwanted material from over the sample 108. Generally, bubbles, debris, or unwanted material can interfere with the SMI and the electrochemical testing of the sample 108. The vibration motor can be switched on to vibrate the sample 108 and dislodge the bubbles, debris, or unwanted material from the top surface of the sample 108. In some examples, the vibration motor can be positioned on a second surface of the platform 106, where the second surface is positioned outside of the fluid chamber 102 and is directly below a first surface of the platform 106 on which the sample 108 is disposed.

Figure 2:
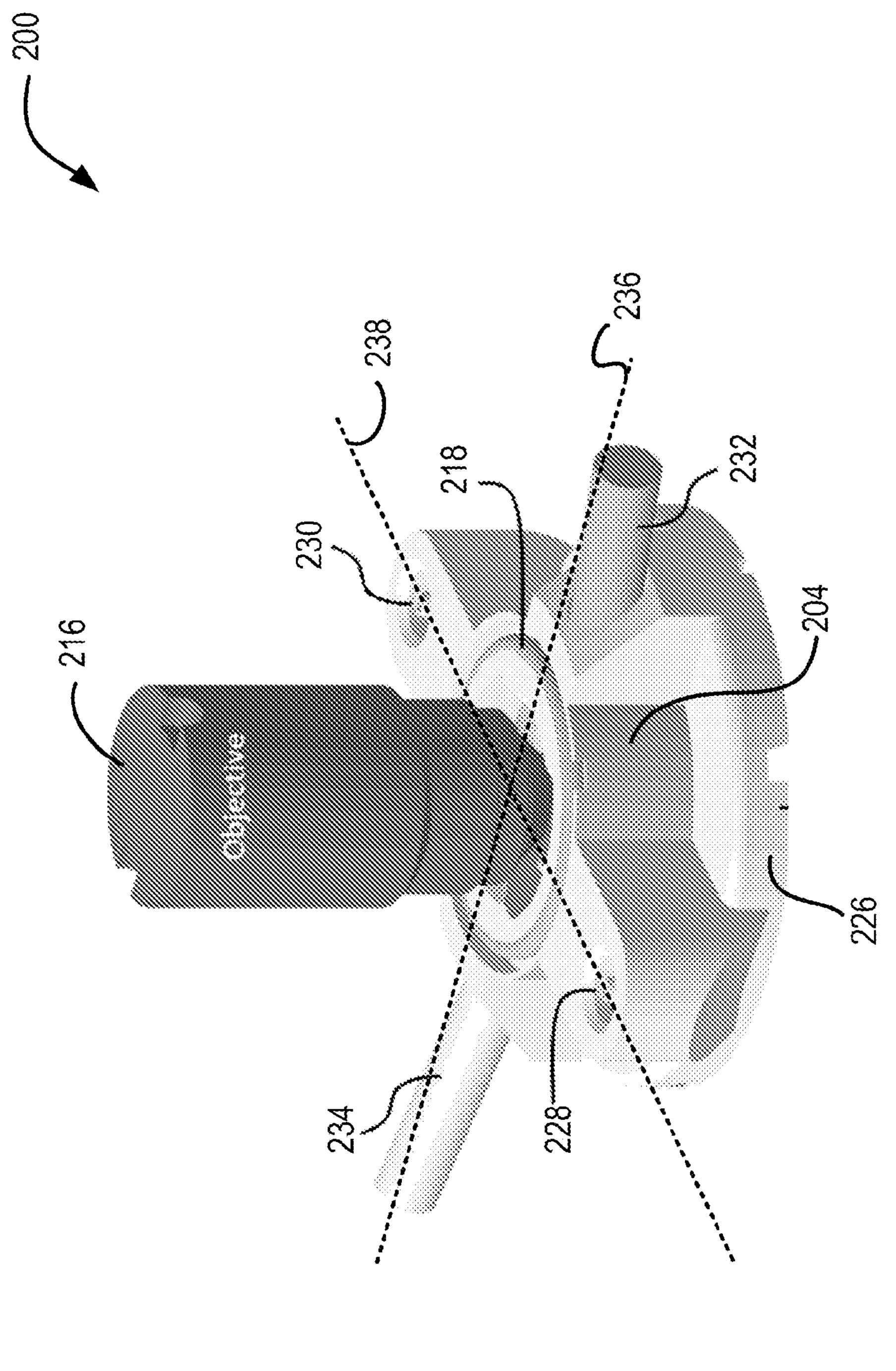
FIG. 2 shows an isometric view of a second example device for in situ examination of a sample under test.
Figure 3:
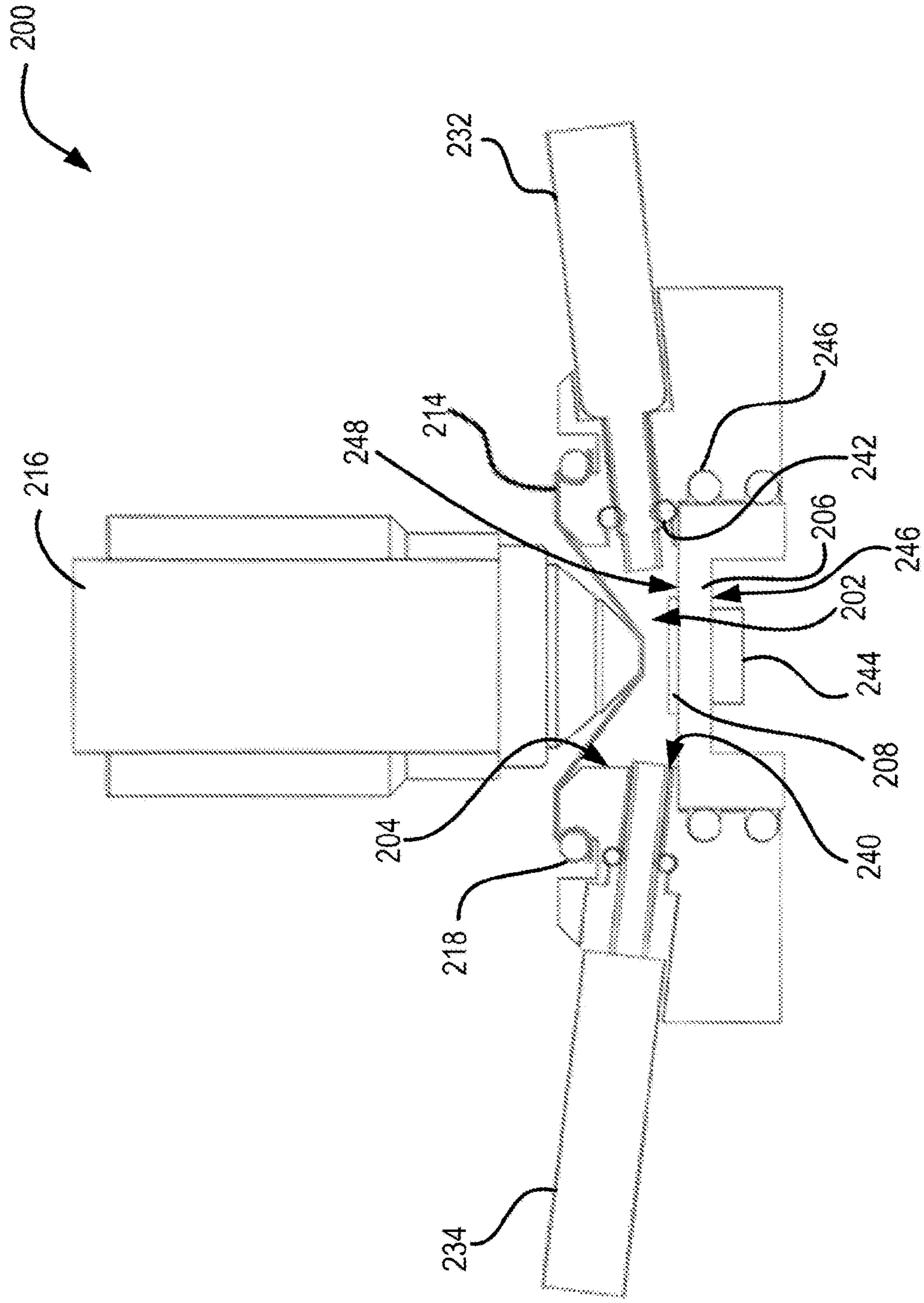
FIG. 3 shows a cross sectional view of the second example device shown discussed above in relation to FIG. 2.

FIG. 2 shows an isometric view of a second example device 200 for in situ examination of a sample under test. In particular, the second example device 200 can be an implementation of the first example device 100 discussed above in relation to FIG. 1. The second example device 200 can be manufactured using techniques such as, for example, additive manufacturing, molding, casting, milling, etc. The second example device 200 includes a chamber wall 204 (similar to the chamber wall 104 discussed above in relation to FIG. 1), which as discussed further below, can define, in part, a fluid chamber. The second example device 200 can include a flange 226 that can extend outwardly from an outer surface of the chamber wall 204. The flange 226 can facilitate securely affixing the second example device 200 to a test bench or other surfaces. An objective lens 216 (similar to the objective lens 116 discussed above in relation to FIG. 1) can be positioned over a moveable transparent window which, in this example, is coupled with a periphery of the chamber wall 204 using an O-ring 218 (similar to O-ring 118). The periphery of the chamber wall 204 can define an opening to a fluid chamber where the opening can have a diameter of a few millimeters to about 100 mm. the opening can be covered with the moveable transparent window (as shown in FIG. 3) to form a leak proof seal with the periphery. The second example device 200 also includes an inlet channel, one end 228 of which his shown in FIG. 2. Similarly, the second example device 200 can also include an outlet channel, one end 230 of which is shown in FIG. 2. The second example device 200 can accommodate a camera 232 and a first electrode 234. As discussed further below, the chamber wall 204 can define a camera opening for accommodating the camera 232, and can include a first electrode opening to accommodate the first electrode 234.

FIG. 3 shows a cross sectional view of the second example device 200 discussed above in relation to FIG. 2. In particular, the cross-sectional view of the second example device 200 is taken in a plane that includes the first axis 236 (shown in FIG. 2). The second example device 200 can include a chamber wall 204 (similar to the chamber wall 104 discussed above in relation to FIG. 1) that defines in part a fluid chamber 202 (similar to the fluid chamber 102). The second example device 200 can further include a first electrode opening 240 and a camera opening 242. The first electrode opening can be defined in the chamber wall 204 and can allow at least a portion of the first electrode 234 to be positioned in the fluid chamber 202. The camera opening 242 can allow at least a portion of the camera 232 to be pointed at the fluid chamber 202. The first electrode 234 and the camera 232 can be positioned such that they form a leak-proof seal with the chamber wall 204 to prevent leakage of the fluid within the fluid chamber 202 from leaking out through the first electrode opening 240 and the camera opening 242. In one example, O-rings can be used to form a leak-proof seal between the body of the camera 232 and the chamber wall 204 and the body of the first electrode 234 and the chamber wall 204. The camera 232 and the first electrode 234 to be removably attached to the chamber wall 204 using the O-rings or other fastening means such as clamps, bolts, screw-threads, etc.

The second example device 200 can include a platform 206 (similar to the platform 106) at least a portion of which is positioned in the fluid chamber 202. The platform 206 can have a first surface within the fluid chamber 202 over which a sample 208 (similar to sample 108) can be positioned. In the example shown in FIG. 2, the platform 206 can be separable from the chamber wall 204 to allow removal and/or replacement of the sample 208. The platform 206 can be held in place within the second example device 200 and create a leak proof seal with the chamber wall 204 with the aid of one or more O-rings 246. Using the one or more O-rings 246 is only one example of securing the platform 206 to the chamber wall 204, and that the platform 206 may be alternatively secured to the chamber wall 204 by other fastening means such as clamps, bolts, screw-threads, etc.

The second example device 200 can include a moveable transparent window 214 (similar to the moveable transparent window 114 discussed above in relation to FIG. 1). In the example shown in FIG. 1, the moveable transparent window 214 is attached to the periphery of the chamber wall 204 using a set of O-rings 218 (similar to the O-ring 118 show in FIG. 1), but as discussed above in relation to the moveable transparent window 114 shown in FIG. 1, the moveable transparent window 214 can be attached to the chamber wall 204 using other fastening means. The moveable transparent window 214 can have properties similar to those discussed above in relation to the moveable transparent window 114 shown in FIG. 1.

The second example device 200 can also include a vibration motor 244 that can be used to induce vibrations in the sample 208 to dislodge any bubbles, debris, or unwanted material from over the sample 208. In the example shown in FIG. 3, the vibration motor 244 can be positioned on a second surface 246 of the platform 206, where the second surface 248 is positioned outside of the fluid chamber 202 and is directly below the first surface 248 of the platform 206 on which the sample 208 is positioned. The vibration motor 244 can be similar to the vibration motor discussed above in relation to FIG. 1.

Figure 4:
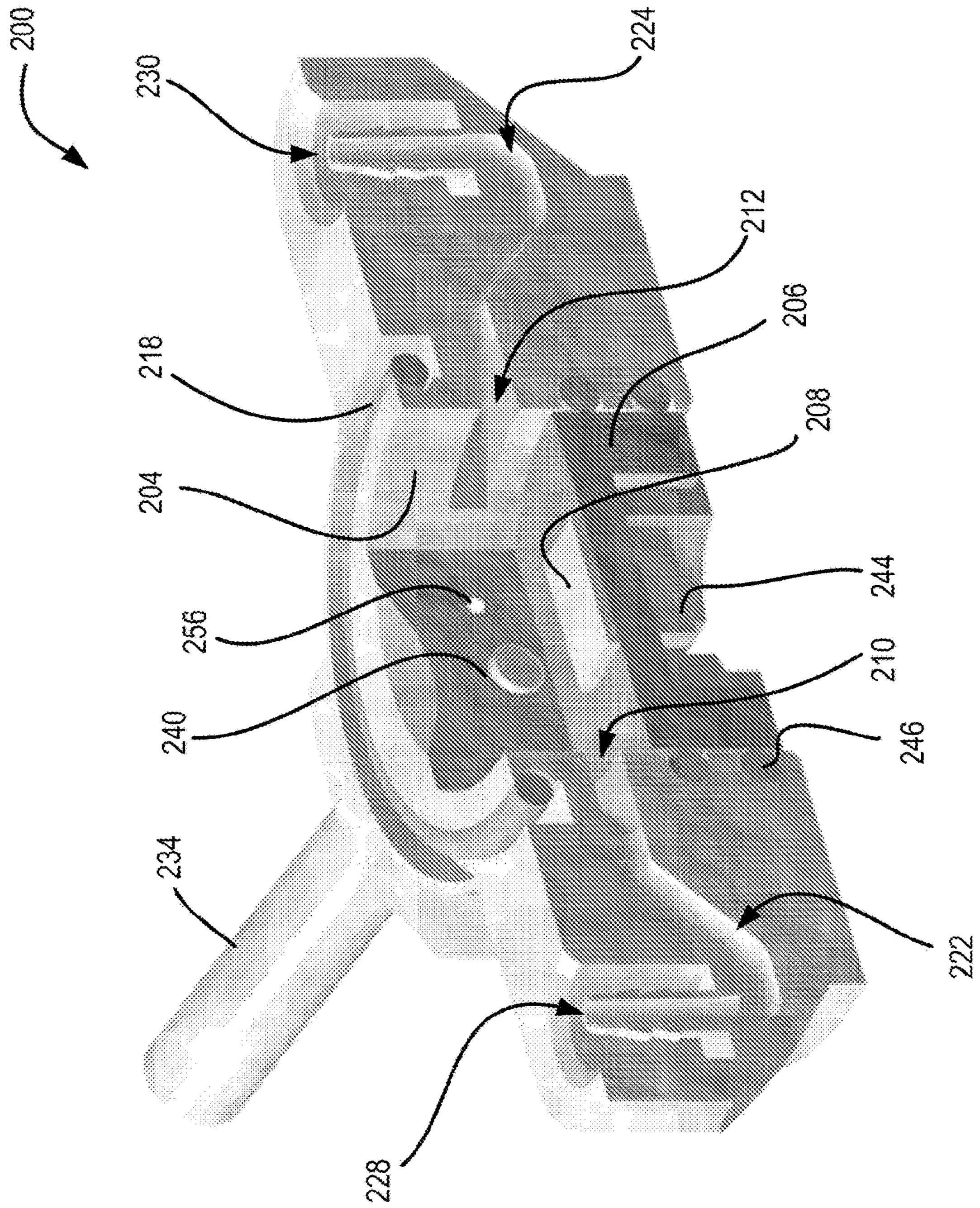
FIG. 4 shows a fluid inlet and a fluid outlet defined in the chamber wall of the device.

FIG. 4 shows a cut-away view of the second example device 200 shown in FIGS. 2 and 3. In particular, FIG. 4 shows a cut-away view in relation to a plane that includes the second axis 238. The objective lens 216 and the moveable transparent window 214 have been removed to merely to allow visibility to other components of the second example device 200. FIG. 4 shows a fluid inlet 210 and a fluid outlet 212 defined in the chamber wall 204. The fluid inlet 210 and the fluid outlet 212 can be similar to the fluid inlet 110 and the fluid outlet 112 discussed above in relation to FIG. 1. FIG. 4 shows an inlet channel 222, one end of which terminates at the fluid inlet 210 and an outlet channel 224, one end of which terminates at the fluid outlet 212. The inlet channel 222 allows fluid communication between an inlet channel opening 228 and the fluid inlet 210, while the outlet channel 224 allows fluid communication between an outlet channel opening 230 and the fluid outlet 212. The fluid inlet 210 and the fluid outlet 212 have substantially rectangular shape. However, the shape can be different from being rectangular such as, for example, circular, oval, or polygonal (regular or irregular). In some instances, multiple fluid inlets and multiple fluid outlets. In some examples, the multiple fluid inlets can be in fluidly communication with a single inlet channel 222 and the multiple fluid outlets can be in fluid communication with a single outlet channel 224. In some other instances, multiple fluid inlets and multiple fluid outlets can be in fluid communication with multiple inlet channels and multiple outlet channels, respectively. in some instances, more than one fluid inlet channels and more than one fluid outlet channels can be in fluid communication with the fluid inlet 210 and the fluid outlet 212 respectively. In the example shown in FIGS. 2-4, the fluid inlet 210 and the fluid outlet 212 are positioned diametrically opposite each other. In some instances, this can be advantageous in ensuring a smooth fluid flow within the fluid chamber 202. However, the fluid inlet 210 and the fluid outlet 212 can positioned at any radial position with respect to each other. Similarly, the inlet channel 222 and the outlet channel 224 including the inlet channel opening 228 and the outlet channel opening 230 can be positioned at anywhere in the second example device 200 and not necessarily diametrically opposite each other as shown in FIGS. 2-4.

The second example device 200 can further include a second electrode opening 256 for receiving a second electrode (not shown). While not shown in FIG. 4, the second example device 200 can include a second electrode channel, one end of which terminates at the second electrode opening 256. The second example device 200 also can include a conduit that accommodates a sample electrode that can electrically couple with the sample 208. The conduit, for example, can be formed in the platform 206 or in the chamber wall 204. While the first electrode opening 240 and the second electrode opening 256 are shown as being adjacent to each other, it should be noted that in some other examples, the first electrode opening 240 and the second electrode opening 256 may be positioned at different locations.

Figure 5:
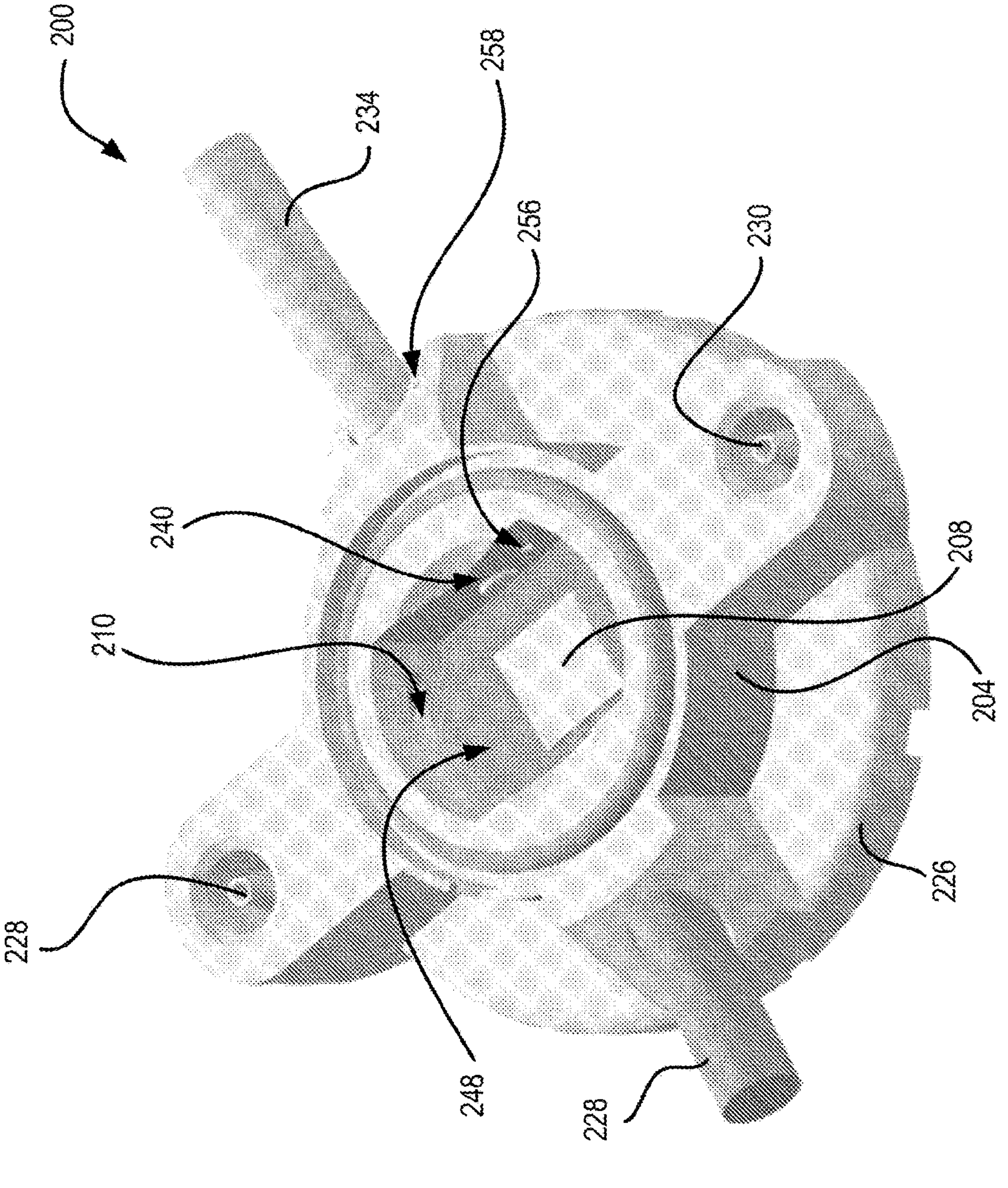
FIG. 5 shows a second electrode channel outlet positioned on an outer surface of the chamber wall.

FIG. 5 shows a top view of the second example device 200 discussed above in relation to FIGS. 2-4. In particular, the objective lens 216 and the moveable transparent window 214 have been removed for the sake of clarity. FIG. 5 shows a second electrode channel outlet 258 positioned on an outer surface of the chamber wall 204. The second electrode channel outlet 258 can be in fluid communication with the second electrode opening 256 via a second electrode channel (not shown) formed in the chamber wall 204. A second electrode can pass through the second electrode channel outlet 258, the second electrode channel, and the second electrode opening 256. In some instances, the second electrode can be positioned around the sample 208 on the second surface 248 of the platform 206.

Figure 6:
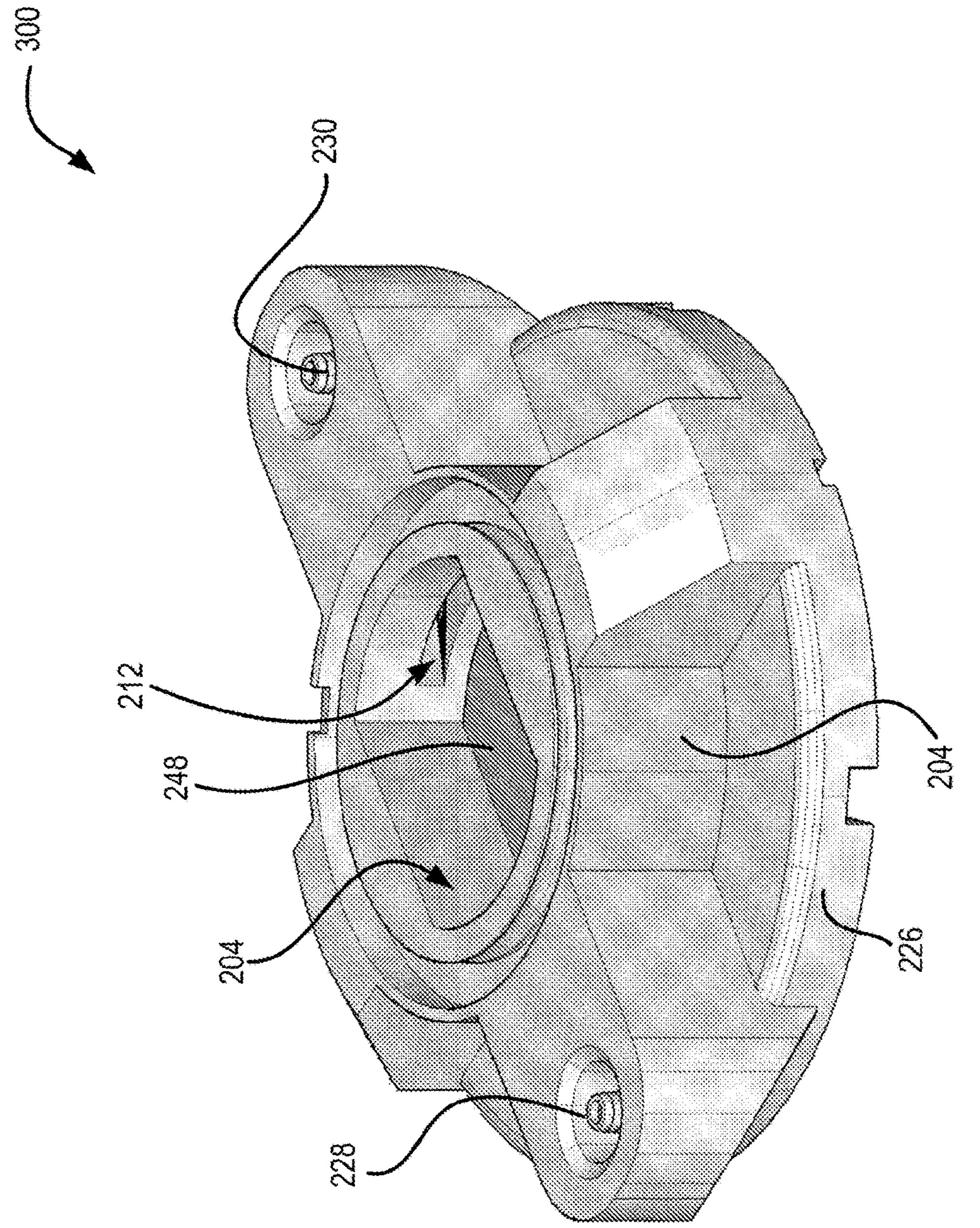
FIG. 6 shows an isometric view of a third example device for in situ examination of a sample under test.

FIG. 6 shows an isometric view of a third example device 300 for in situ examination of a sample under test. The third example device 300 is similar to the first example device 100 and the second example device 200 discussed above in relation to FIGS. 1-5, however, the third example device 300 does not include any openings or channels for electrodes and does not include any openings or channels for a camera. The third example device 300 can be utilized in testing of samples where electrochemical testing based on electrodes is not needed and where close inspection of the sample using a camera is not needed. To that end, the third example device 300 is devoid of the first electrode opening 240, the first electrode 234, the second electrode opening 256, the camera opening 242, and the camera 232. As mentioned above in relation to the second example device 200, the inlet channel opening 228 and the outlet channel opening 230 need not be positioned diametrically opposite each other as shown in FIG. 6. Similarly, the fluid inlet 210 (not visible in FIG. 6) and the fluid outlet 212 need not be positioned diametrically opposite each other as shown in FIG. 6. The positions of these elements can be anywhere based on the implementation. All the features discussed above in relation to FIGS. 1-5, other than those related to electrodes, are included in the third example device 300 shown in FIG. 6.

Figure 7:
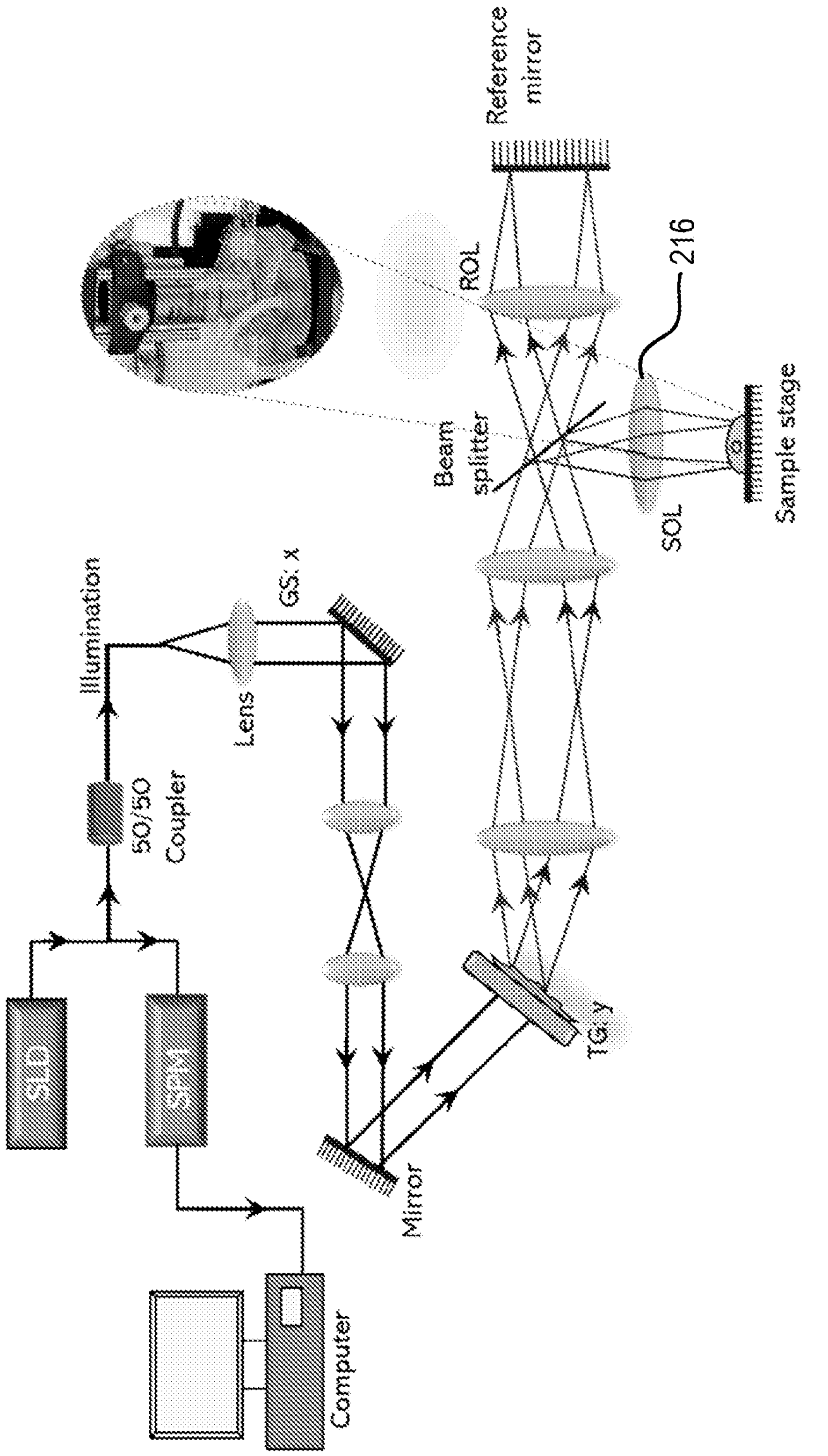
FIG. 7 shows a schematic of a spectral modulation interferometry setup.

FIG. 7 shows a schematic of an example spectral modulation interferometry setup. SMI is based on spectral-domain interferometry and has high optical pathlength (OPL) sensitivity and high acquisition speed (up to, for example, 120 Hz) with sub-nanometer vertical and sub-micrometer lateral resolution. FIG. 7 illustrates the schematic SMI setup and the principle behind the technique for phase imaging. The signal model and processing procedure in SMI, is very similar to off-axis DHM techniques. However, its dispersive and confocal imaging scheme eliminates laser speckle, producing speckle-free coherent images with high phase sensitivity and imaging rate.

As shown in FIG. 7, SMI uses broadband, spatially-coherent light from a superluminescent diode (e.g., SLD, Superlum: λ=837 nm, Δλ=54 nm) coupled into singlemode fiber. A 50/50 fiber coupler directs light into the system, where it is launched into the free-space optical path via a collimating lens. A ID galvo-scanner (x-direction) scans the collimated beam in one dimension, while a transmission grating (e.g., Wasatch Photonics: 600 mm-1) disperses the beam into propagation angles varying by wavelength (y-direction). The dispersed beam is then focused by the microscope objectives in the form of a wavelength dispersed line, similar to other forms of spectrally-encoded imaging, and the galvo scanner scans the line over the sample to buildup two-dimensional images.

The reflected beams from the sample and reference mirrors are back-propagated through the system and directed to the spectrometer by the fiber coupler. The interference spectrums are then recorded by the custom spectrometer with a line scan camera (e.g., e2v: EM1, 1024-pixel, maximum line rate 78 kHz). Afterward, the recorded interference patterns are subjected to numerical processing by a Fourier transform. After reconstruction, each interferogram produces an amplitude-contrast image (similar to a typical optical microscope image in reflection mode) and a phase-contrast image that contains surface height information. Eq. (4) shows SMI's signal model for estimating sample surface heights. The interference intensity I(x, y) recorded by the spectrometer is modulated by the sample phase ϕs(x, y) obtained from the optical interference of complex sample amplitude Es(x, y) and reference amplitude Er(x, y). L0 is the initial OPL offset of the Linnik interferometer (L0=Ls−Lr), k0 is the starting wavenumber, and α (in rad m−2) is the dispersion coefficient of grating-diffracted beams. Sample surface height information is contained in the phase term ϕs(x, y). In this configuration, variations in phase information on the sample due to the corrosion process as a function of time can be obtained. That is, different optical paths originate from the different depths of pits (arising from corrosion), producing delays in optical phase which, according to Eq. (4), produce distinct changes in the detected optical interference pattern.

$$I(x, y) = |E_r|^2 + |E_s(x, y)|^2 + 2E_r E_s(x, y)\cos(2k_0L_0 + 2\alpha L_0(y) + 2\phi_s(x, y)) \quad \text{Eq. (4)}$$

SOL (the objective lens 216) can be utilized as the objective lens in the devices discussed above in relation to FIGS. 1-5.

As mentioned above in relation to the FIGS. 1-5, the devices include at least one fluid inlet and at least one fluid outlet to allow fluid flow over the sample. The flowing fluid or solution can provide nominally undersaturated conditions, thereby allowing for the study of only the corrosion rate without precipitation of corrosion products at the surface. Of course, in instances where physical properties other than corrosion are being tested, the fluid flow can help improve the accuracy of the test. The flowing conditions also remove any gas bubbles in the solution produced during the reaction. In some examples, the devices discussed above in relation to FIGS. 1-6 can be formed using chemically inert and electrically insulative methacrylated polymer. However, other materials that are inert and provide electric insulation can also by used. In the examples discussed above, the devices accommodated the SMI objective lens and the three electrodes: the working electrode (WE) (e.g., the electrode 120, FIG. 1), the reference electrode (RE) (e.g., the first electrode 234), and the counter electrode (CE) (e.g., the second electrode associated with the second electrode opening 256 shown in FIG. 4). In some examples, where the sample is undergoing a corrosion test, the CE can be made of stainless steel and the RE can be made of silver-silver chloride. The CE and the WE can each have an area, for example, of about 1.6 cm squared. The devices can also include inlet and outlet ports for the flowing solution, which can include a 0.5 wt. % sodium chloride solution acidified to a pH of about 2.9 by acetic acid, in particular for corrosion testing of the sample.

The discussion herein describes several aspects of the apparatus that can be implemented separately or in combination with other aspects of the disclosure without departing from the disclosure. The following lists a non-limiting set of aspects of the display device should not be confused with the claims.

Aspect 1: In some aspects, the techniques described herein relate to a fluid cell, including: a chamber wall defining in part a fluid chamber, a fluid inlet, a fluid outlet, and an electrode opening for receiving an electrode: a platform, at least a portion of which is positioned within the fluid chamber, the platform having a first surface for positioning a sample; and a moveable transparent window positioned opposite the platform, the moveable window configured to move towards or away from the first surface of the platform, the moveable window defining in part the fluid chamber.

Aspect 2: The fluid cell with respect to any one of the aspects 1, 3-18, the chamber wall further defining a camera opening for accommodating a camera.

Aspect 3: The fluid cell with respect to any one of the aspects 1-2, 4-18, wherein the fluid inlet is positioned opposite the fluid outlet.

Aspect 4: The fluid cell with respect to any one of the aspects 1-3, 5-18, wherein the platform is positioned between the fluid inlet and the fluid outlet.

Aspect 5: The fluid cell with respect to any one of the aspects 1-4, 6-18, further including: an inlet channel, one end of which terminates at the fluid inlet; and an outlet channel, one end of which terminates at the fluid outlet.

Aspect 6: The fluid cell with respect to any one of the aspects 1-5, 7-18, wherein the moveable optical window includes a transparent flexible film.

Aspect 7: The fluid cell with respect to any one of the aspects 1-6, 8-18, wherein the transparent flexible film includes a polymer film.

Aspect 8: The fluid cell with respect to any one of the aspects 1-7, 9-18, wherein the transparent flexible film is coupled with a periphery of the chamber wall.

Aspect 9: The fluid cell with respect to any one of the aspects 1-8, 10-18, wherein the moveable optical window includes a rigid portion and a flexible portion coupled with the rigid portion.

Aspect 10: The fluid cell with respect to any one of the aspects 1-9, 11-18, wherein the flexible portion is coupled with a periphery of the chamber wall.

Aspect 11: The fluid cell with respect to any one of the aspects 1-10, 12-18, wherein the moveable transparent window moves towards or away from the first surface of the platform responsive to a force imparted by an objective lens housing.

Aspect 12: The fluid cell with respect to any one of the aspects 1-11, 13-18, wherein the objective lens is part of a spectral modulation interferometry setup.

Aspect 13: The fluid cell with respect to any one of the aspects 1-12, 14-18, wherein the moveable transparent window has a refractive index that is within about 1-15% of a refractive index of a fluid within the fluid chamber.

Aspect 14: The fluid cell with respect to any one of the aspects 1-13, 15-18, further including: an electrode channel, one end of which terminates at the electrode opening.

Aspect 15: The fluid cell with respect to any one of the aspects 1-14, 16-18, wherein the electrode opening is a first electrode opening, the electrode is a first electrode, and the electrode channel is first electrode channel, the fluid cell further including: the chamber wall further defining a second electrode opening for receiving a second electrode; and a second electrode channel, one end of which terminates at the second electrode opening.

Aspect 16: The fluid cell with respect to any one of the aspects 1-15, 17-18, wherein the platform includes resin.

Aspect 17: The fluid cell with respect to any one of the aspects 1-16, 18, further including: a vibration motor positioned on a second surface of the platform, the second surface of the platform positioned outside of the fluid chamber.

Aspect 18: The fluid cell with respect to any one of the aspects 1-17, wherein the platform includes a conduit that accommodates a sample electrode electrically coupled with the sample.

Aspect 19: In some aspects, the techniques described herein relate to a fluid cell, including: a chamber wall defining in part a fluid chamber, a fluid inlet and a fluid outlet; a platform, at least a portion of which is positioned within the fluid chamber, the platform having a first surface for positioning a sample; and a moveable transparent window positioned opposite the platform, the moveable window configured to move towards or away from the first surface of the platform, the moveable window defining in part the fluid chamber.

Aspect 20: The fluid cell with respect to any one of the aspects 19, 21-31, the chamber wall further defining a camera opening for accommodating a camera.

Aspect 21: The fluid cell with respect to any one of the aspects 19-20, 22-31, wherein the fluid inlet is positioned opposite the fluid outlet.

Aspect 22: The fluid cell with respect to any one of the aspects 19-21, 23-31, wherein the platform is positioned between the fluid inlet and the fluid outlet.

Aspect 23: The fluid cell with respect to any one of the aspects 19-22, 24-31, further including: an inlet channel, one end of which terminates at the fluid inlet; and an outlet channel, one end of which terminates at the fluid outlet.

Aspect 24: The fluid cell with respect to any one of the aspects 19-23, 25-31, wherein the moveable optical window includes a transparent flexible film.

Aspect 25: The fluid cell with respect to any one of the aspects 19-24, 26-31, wherein the transparent flexible film includes a polymer film.

Aspect 26: The fluid cell with respect to any one of the aspects 19-25, 27-31, wherein the transparent flexible film is coupled with a periphery of the chamber wall.

Aspect 27: The fluid cell with respect to any one of the aspects 19-26, 28-31, wherein the moveable optical window includes a rigid portion and a flexible portion coupled with the rigid portion.

Aspect 28: The fluid cell with respect to any one of the aspects 19-27, 29-31, wherein the flexible portion is coupled with a periphery of the chamber wall.

Aspect 29: The fluid cell with respect to any one of the aspects 19-28, 30-31, wherein the moveable transparent window moves towards or away from the first surface of the platform responsive to a force imparted by an objective lens housing.

Aspect 30: The fluid cell with respect to any one of the aspects 19-29, 31, wherein the objective lens is part of a spectral modulation interferometry setup.

Aspect 31: The fluid cell with respect to any one of the aspects 19-30, wherein the moveable transparent window has a refractive index that is within about 1-15% of a refractive index of a fluid within the fluid chamber.

References: All cited references, patent or literature, are incorporated by reference in their entirety. The examples disclosed herein are illustrative and not limiting in nature. Details disclosed with respect to the methods described herein included in one example or embodiment may be applied to other examples and embodiments. Any aspect of the present disclosure that has been described herein may be disclaimed, i.e., exclude from the claimed subject matter whether by proviso or otherwise.

[1] R. Rodrigues, S. Gaboreau, J. Gance, I. Ignatiadis, S. Betelu, Reinforced concrete structures: A review of corrosion mechanisms and advances in electrical methods for corrosion monitoring, Constr. Build. Mater. (2020) 121240.

[2] C. Wang, Y. Cai, C. Ye, S. Dong, X. Cai, Y. Cao, C. Lin, In situ monitoring of the localized corrosion of 304 stainless steel in FeC3 solution using a joint electrochemical noise and scanning reference electrode technique, Electrochem. Commun. 90 (2018) 11-15.

[3] B. Zhang, J. Wang, B. Wu, X. W. Guo, Y. J. Wang, D. Chen, Y. C. Zhang, K. Du, E. E. Oguzie, X. L. Ma, Unmasking chloride attack on the passive film of metals, Nat. Commun. 9 (2018) 1-9.

[4] J. Orlikowski, A. Jazdzewska, R. Mazur, K. Darowicki, Determination of pitting corrosion stage of stainless steel by galvanodynamic impedance spectroscopy, Electrochim. Acta. 253 (2017) 403-412.

[5] N. N. Khobragade, M. I. Khan, A. P. Patil, Corrosion behaviour of chrome-manganese austenitic stainless steels and AISI 304 stainless steel in chloride environment, Trans. Indian Inst. Met. 67 (2014) 263-273.

[6] T. Laitinen, Localized corrosion of stainless steel in chloride, sulfate and thiosulfate containing environments, Corros. Sci. 42 (2000) 421-441.

[7] N. A. Mariano, D. Spinelli, Stress corrosion cracking of stainless steel used in drill collars, Mater. Sci. Eng. A. 385 (2004) 212-219.

[8] L. Wang, S. Chen, B. Yuan, F. Meng, J. Wang, C. Wang, L. Liang, Digital holographic reconstruction detection of localized corrosion arising from scratches, J. Serbian Chem. Soc. 75 (2010) 505-512.

[9] O. Pedram, E. Poursaeidi, R. Khamedi, H. Shayani-jam, Y. Mollapour, Development of an accelerated test for pitting corrosion of CUSTOM 450 by rDHM, Int. J. Mater. Res. 112 (2021) 600-609.

[10] G. H. Koch, M. P. H. Brongers, N. G. Thompson, Y. P. Virmani, J. H. Payer, Corrosion cost and preventive strategies in the United States, United States. Federal Highway Administration, 2002.

[11] S. R. Francia, J. C. Y. Llanos, Materiales: la corrosión, su tradición y alcances, Rev. Del Inst. Investig. La Fac. Ing. Geológica, Minera, Met. y Geográfica. 6 (2003) 71-77.

[12] G. Koch, J. Varney, N. Thompson, O. Moghissi, M. Gould, J. Payer, International Measures of Prevention, Application, and Economics of Corrosion Technologies Study, NACE International, Houston, T X, 2016.

[13] C. Vasilescu, S. I. Drob, P. Osiceanu, P. Drob, J. M. C. Moreno, S. Preda, S. Ivanescu, E. Vasilescu, Surface analysis, microstructural, mechanical and electrochemical properties of new Ti-15Ta-5Zr alloy, Met. Mater. Int. 21 (2015) 242-250.

[14] E. Poursaeidi, A. M. Niaei, M. Arablu, A. Salarvand, Experimental investigation on erosion performance and wear factors of custom 450 steel as the first row blade material of an axial compressor, Int. J. Surf. Sci. Eng. 11 (2017) 85-99.

[15] O. Oudbashi, S. M. Emami, H. Ahmadi, P. Davami, Micro-stratigraphical investigation on corrosion layers in ancient Bronze artefacts by scanning electron microscopy energy dispersive spectrometry and optical microscopy, Herit. Sci. 1 (2013) 1-10.

[16] O. Oudbashi, Multianalytical study of corrosion layers in some archaeological copper alloy artefacts, Surf. Interface Anal. 47 (2015) 1133-1147.

[17] G. Fargas, M. Anglada, A. Mateo, Effect of the annealing temperature on the mechanical properties, formability and corrosion resistance of hot-rolled duplex stainless steel, J. Mater. Process. Technol. 209 (2009) 1770-1782.

[18] E. Poursaeidi, A. M. Niaei, M. Lashgari, K. Torkashvand, Experimental studies of erosion and corrosion interaction in an axial compressor first stage rotating blade material, Appl. Phys. A. 124 (2018) 1-15.

[19] B. Zhang, X. L. Ma, A review-Pitting corrosion initiation investigated by TEM, J. Mater. Sci. Technol. 35 (2019) 1455-1465.

[20] A. Kosari, H. Zandbergen, F. Tichelaar, P. Visser, P. Taheri, H. Terryn, J. M. C. Mol, In-situ nanoscopic observations of dealloying-driven local corrosion from surface initiation to in-depth propagation, Corros. Sci. 177 (2020) 108912. doi: https://doi.org/10.1016/j.corsci.2020.108912.

[21] A. Kosari, F. Tichelaar, P. Visser, P. Taheri, H. Zandbergen, H. Terryn, J. M. C. Mol, Nanoscopic and in-situ cross-sectional observations of Li-based conversion coating formation using liquid-phase TEM, Npj Mater. Degrad. 5 (2021) 40. doi: 10.1038/s41529-021-00189-y.

[22] S. M. Ghahari, A. J. Davenport, T. Rayment, T. Suter, J.-P. Tinnes, C. Padovani, J. A. Hammons, M. Stampanoni, F. Marone, R. Mokso, In situ synchrotron X-ray micro-tomography study of pitting corrosion in stainless steel, Corros. Sci. 53 (2011) 2684-2687

[23] R. Rizzo, S. Baier, M. Rogowska, R. Ambat, An electrochemical and X-ray computed tomography investigation of the effect of temperature on CO2 corrosion of 1Cr carbon steel, Corros. Sci. 166 (2020) 108471.

[24] A. S. S. Singaravelu, J. J. Williams, H. D. Goyal, S. Niverty, S. S. Singh, T. J. Stannard, X. Xiao, N. Chawla, 3D time-resolved observations of fatigue crack initiation and growth from corrosion pits in A1 7XXX alloys using in situ synchrotron X-ray tomography, Metall. Mater. Trans. A. 51 (2020) 28-41.

[25] F. A. Almuaili, S. A. McDonald, P. J. Withers, D. L. Engelberg, Application of a quasi in situ experimental approach to estimate 3-D pitting corrosion kinetics in stainless steel, J. Electrochem. Soc. 163 (2016) C745.

[26] H. Chen, Z. Qin, M. He, Y. Liu, Z. Wu, Application of electrochemical atomic force microscopy (E C-AFM) in the corrosion study of metallic materials, Materials. 13 (2020) 668.

[27] K. Yasakau, Application of AFM-Based Techniques in Studies of Corrosion and Corrosion Inhibition of Metallic Alloys, Corros. Mater. Degrad. 1 (2020) 345-372.

[28] X. Shi, W. Qing, T. Marhaba, W. Zhang, Atomic force microscopy-Scanning electrochemical microscopy (AFM-SECM) for nanoscale topographical and electrochemical characterization: Principles, applications and perspectives, Electrochim. Acta. 332 (2020) 135472.

[29] B. Diaz-Benito, F. Velasco, S. Guzmán, R. Calabres, AFM study of steel corrosion in aqueous solutions in concrete, Mater. Construcción. 61 (2011) 27-37. doi: 10.3989/mc.2010.59410.

[30] J. Sanchez, J. Fullea, C. Andrade, J. J. Gaitero, A. Porro, AFM study of the early corrosion of a high strength steel in a diluted sodium chloride solution, Corros. Sci. 50 (2008) 1820-1824. doi: 10.1016/j.corsci.2008.03.013.

[31] A. Ma, L. Zhang, D. Engelberg, Q. Hu, S. Guan, Y. Zheng, Understanding crystallographic orientation dependent dissolution rates of 90Cu-10Ni alloy: New insights based on AFM/SKPFM measurements and coordination number/electronic structure calculations, Corros. Sci. 164 (2020) 108320. doi: 10.1016/j.corsci.2019.108320.

[32] P. Guo, E. C. La Plante, B. Wang, X. Chen, M. Balonis, M. Bauchy, G. Sant, Direct observation of pitting corrosion evolutions on carbon steel surfaces at the nano-to-micro-scales, Sci. Rep. 8 (2018) 7990. doi: 10.1038/s41598-018-26340-5.

[33] J. Heuer, A. Luttge, Kinetics of pipeline steel corrosion studied by Raman spectroscopy-coupled vertical scanning interferometry, Npj Mater. Degrad. 2 (2018) 40. doi: 10.1038/s41529-018-0061-2.

[34] H. Torbati-Sarraf, T. J. Stannard, E. C. La Plante, G. N. Sant, N. Chawla, Direct observations of microstructure-resolved corrosion initiation in AA7075-T651 at the nanoscale using vertical scanning interferometry (VSI), Mater. Charact. 161 (2020) 110166.

[35] Y. Pourvais, P. Asgari, P. Abdollahi, R. Khamedi, A.-R. Moradi, Microstructural surface characterization of stainless and plain carbon steel using digital holographic microscopy, J. Opt. Soc. Am. B. 34 (2017) 36-41. doi: 10.1364/JOSAB.34.000B36.

[36] P. Asgari, Y. Pourvais, P. Abdollahi, A. R. Moradi, R. Khamedi, A. Darudi, Digital holographic microscopy as a new technique for quantitative measurement of microstructural corrosion in austenitic stainless steel, Mater. Des. 125 (2017) 109-115. doi: 10.1016/j.matdes.2017.03.085.

[37] L. Li, C. Wang, S. Chen, X. Yang, B. Yuan, H. Jia, An investigation on general corrosion and pitting of iron with the in-line digital holography, Electrochim. Acta. 53 (2008) 3109-3119.

[38] B. Yuan, Z. Li, S. Tong, L. Li, C. Wang, In situ monitoring of pitting corrosion on stainless steel with digital holographic surface imaging, J. Electrochem. Soc. 166 (2019) C3039-C3047. doi: 10.1149/2.0061911jes.

[39] J. A. M. Salgado, D. M. Cruz, J. U. Chavarin, O. S. Martinez, Quantification of corrosion products formation onto a copper sample by digital holographic microscopy, Appl. Phys. Lett. 11 (1967) 77-79.

[40] J. Jiang, Y. Liu, H. Chu, D. Wang, H. Ma, W. Sun, Pitting corrosion behaviour of new corrosion-resistant reinforcement bars in chloride-containing concrete pore solution, Materials. 10 (2017) 903. doi: 10.3390/ma10080903.

[41] Y. Hu, X. Li, Z. Jiao, G. Gao, B. Yuan, L. Li, C. Wang, Investigation into the anodic dissolution processes of copper in neutral and acidic sulfate solutions with the in-line digital holography, Electrochemistry. 84 (2016) 378-382. doi: 10.5796/electrochemistry.84.378.

[42] M. Zhang, B. Yuan, Q. Wu, Y. Zhu, L. Li, C. Wang, Study of the effects of the magnetic field on the anodic dissolution of nickel with in-line digital holography, Int. J. Electrochem. Sci. 13 (2018) 739-751. doi: 10.20964/2018.01.46.

[43] M. K. Kim, Digital Holographic Microscopy, Springer, New York, 2011. doi: 10.1007/978-1-4419-7793-9.

[44] M. Mir, B. Bhaduri, R. Wang, R. Zhu, G. Popescu, Quantitative phase imaging, in: E. Wolf (Ed.), Prog. Opt., Elsevier, 2012: pp. 133-217. doi: 10.1016/B978-O-44-459422-8.00003-5.

[45] A. Luttge, R. S. Arvidson, Reactions at surfaces: A new approach integrating interferometry and kinetic simulations, J. Am. Ceram. Soc. 93 (2010) 3519-3530. doi: 10.1111/j.1551-2916.2010.04141.x.

[46] C. Fischer, R. S. Arvidson, A. Lüttge, How predictable are dissolution rates of crystalline material?, Geochim. Cosmochim. Acta. 98 (2012) 177-185. doi: 10.1016/j.gca.2012.09.011.

[47] C. Fischer, I. Kurganskaya, T. Schäfer, A. Lüttge, Variability of crystal surface reactivity: What do we know?, Appl. Geochemistry. 43 (2014) 132-157. doi: 10.1016/j.apgeochem.2014.02.002.

[48] C. Fischer, A. Luttge, Beyond the conventional understanding of water-rock reactivity, Earth Planet. Sci. Lett. 457 (2017) 100-105. doi: 10.1016/j.epsl.2016.10.019.

[49] I. Bibi, R. S. Arvidson, C. Fischer, A. Lüttge, Temporal evolution of calcite surface dissolution kinetics, Minerals. 8 (2018) 256. doi: 10.3390/min8060256.

[50] C. Fischer, A. Luttge, Pulsating dissolution of crystalline matter, Proc. Natl. Acad. Sci. 115 (2018) 897-902. doi: 10.1073/pnas. 1711254115.

[51] C. Fischer, I. Kurganskaya, A. Luttge, Inherited control of crystal surface reactivity, Appl. Geochemistry. 91 (2018) 140-148. doi: 10.1016/j.apgeochem.2018.02.003.

[52] E. T. Pedrosa, I. Kurganskaya, C. Fischer, A. Luttge, A statistical approach for analysis of dissolution rates including surface morphology, Minerals. 9 (2019) 458. doi: 10.3390/min9080458.

[53] X. Li, Q. Wang, X. Shen, E. T. Pedrosa, A. Luttge, Multiscale investigation of olivine (010) face dissolution from a surface control perspective, Appl. Surf. Sci. 549 (2021) 149317. doi: 10.1016/j.apsusc.2021.149317.

[54] T. Bollermann, C. Fischer, Temporal evolution of dissolution kinetics of polycrystalline calcite, Am. J. Sci. 320 (2020) 53-71. doi: 10.2475/01.2020.04.

[55] P. Agrawal, T. Bollermann, A. Raoof, O. Iliev, C. Fischer, M. Wolthers, The contribution of hydrodynamic processes to calcite dissolution rates and rate spectra, Geochim. Cosmochim. Acta. 307 (2021) 338-350. doi: 10.1016/j.gca.2021.05.003.

[56] A. S. Brand, P. Feng, J. W. Bullard, Calcite dissolution rate spectra measured by in situ digital holographic microscopy, Geochim. Cosmochim. Acta. 213 (2017) 317-329. doi: 10.1016/j.gca.2017.07.001.
[57] P. Feng, A. S. Brand, L. Chen, J. W. Bullard, In situ nanoscale observations of gypsum dissolution by digital holographic microscopy, Chem. Geol. 460 (2017) 25-36. doi: 10.1016/j.chemgeo.2017.04.008.
[58] A. S. Brand, J. W. Bullard, Dissolution kinetics of cubic tricalcium aluminate measured by digital holographic microscopy, Langmuir. 33 (2017) 9645-9656. doi: 10.1021/acs.langmuir.7b02400.
[59] A. S. Brand, S. B. Feldman, P. E. Stutzman, A. V. Ievlev, M. Lorenz, D. C. Pagan, S. Nair, J. M. Gorham, J. W. Bullard, Dissolution and initial hydration behavior of tricalcium aluminate in low activity sulfate solutions, Cem. Concr. Res. 130 (2020) 105989. doi: 10.1016/j.cemconres.2020.105989.
[60] A. S. Brand, J. M. Gorham, J. W. Bullard, Dissolution rate spectra of B-dicalcium silicate in water of varying activity, Cem. Concr. Res. 118 (2019) 69-83. doi: 10.1016/j.cemconres.2019.02.014.
[61] S. Ye, P. Feng, Y. Liu, J. Liu, J. W. Bullard, In situ nano-scale observation of C3A dissolution in water, Cem. Concr. Res. 132 (2020) 106044. doi: 10.1016/j.cemconres.2020.106044.
[62] S. Ye, P. Feng, Y. Liu, J. Liu, J. W. Bullard, Dissolution and early hydration of tricalcium aluminate in aqueous sulfate solutions, Cem. Concr. Res. 137 (2020) 106191. doi: 10.1016/j.cemconres.2020.106191.
[63] A. P. Abbott, M. Azam, K. S. Ryder, S. Saleem, In situ electrochemical digital holographic microscopy: a study of metal electrodeposition in deep eutectic solvents, Anal. Chem. 85 (2013) 6653-6660. doi: 10.1021/ac400262c.
[64] V. Brasiliense, P. Berto, C. Combellas, G. Tessier, F. Kanoufi, Electrochemistry of single nanodomains revealed by three-dimensional holographic microscopy, Acc. Chem. Res. 49 (2016) 2049-2057. doi: 10.1021/acs.accounts.6b00335.
[65] A. Lalisse, A. Al Mohtar, M. C. Nguyen, R. Carminati, J. Plain, G. Tessier, Quantitative temperature measurements in gold nanorods using digital holography, ACS Appl. Mater. Interfaces. 13 (2021) 10313-10320. doi: 10.1021/acsami.0c22420.
[66] B. Yuan, C. Wang, L. Li, S. Chen, Real time observation of the anodic dissolution of copper in NaCl solution with the digital holography, Electrochem. Commun. 11 (2009) 1373-1376. doi: 10.1016/j.elecom.2009.05.008.
[67] G. Gao, B. Yuan, C. Wang, L. Li, S. Chen, The anodic dissolution processes of copper in sodium fluoride solution, Int. J. Electrochem. Sci. 9 (2014) 2565-2574.
[68] S. Dong, X. Chen, E. C. La Plante, M. Gussev, K. Leonard, G. Sant, Elucidating the grain-orientation dependent corrosion rates of austenitic stainless steels, Mater. Des. 191 (2020) 108583. doi: 10.1016/j.matdes.2020.108583.
[69] E. Q. Contreras, J. Huang, R. S. Posusta, D. K. Sharma, C. Yan, P. Guraieb, M. B. Tomson, R. C. Tomson, Optical measurement of uniform and localized corrosion of C1018, S S 410, and Inconel 825 alloys using white light interferometry, Corros. Sci. 87 (2014) 383-391.
[70] J. Jiang, H. Chu, Y. Liu, D. Wang, D. Guo, W. Sun, Galvanic corrosion of duplex corrosion-resistant steel rebars under carbonated concrete conditions, RSC Adv. 8 (2018) 16626-16635.
[71] R. Shang, S. Chen, C. Li, Y. Zhu, Spectral modulation interferometry for quantitative phase imaging, Biomed. Opt. Express. 6 (2015) 473. doi: 10.1364/BOE.6.000473.
[72] G. Svenningsen, M. H. Larsen, J. C. Walmsley, J. H. Nordlien, K. Nisancioglu, Effect of artificial aging on intergranular corrosion of extruded AlMgSi alloy with small Cu content, Corros. Sci. 48 (2006) 1528-1543.
[73] D. Altenpohl, J. G. Kaufman, de la source Aluminum—technology, applications, and environment: a profile of a modern metal: Aluminum from within—the sixth edition, distributeur Aluminum Association: Minerals, Metals & Materials Society, 2017.
[74] P. E. Fortin, M. J. Bull, D. M. Moore, An optimized aluminum alloy (x6111) for auto body sheet applications, SAE Technical Paper, 1983.
[75] B. G. Thomas, J. T. Parkman, T. Chandra, Thermec '97, Int. Conf. on Thermomechanical Processing of Steel and Other Materials, Vol. 2 (1997) 2279-2285.
[76] A. K. Gupta, P. H. Marois, D. J. Lloyd, Study of the precipitation kinetics in a 6000 series automotive sheet material, in: Mater. Sci. Forum, Trans Tech Publ, 1996: pp. 801-808.
[77] L. G. Hector, Y.-L. Chen, S. Agarwal, C. L. Briant, Texture characterization of autogenous Nd: YAG laser welds in AA5182-0 and AA6111-T4 aluminum alloys, Metall. Mater. Trans. A. 35 (2004) 3032-3038.
[78] A. S. Brand, Phase uncertainty in digital holographic microscopy measurements in the presence of solution flow conditions, J. Res. Natl. Inst. Stand. Technol. 122 (2017) 022 1-41. doi: 10.6028/jres.122.022.
[79] K. Kletetschka, J. D. Rimstidt, T. E. Long, F. M. Michel, Suitability of 3D-Printed devices for low-temperature geochemical experiments, Appl. Geochemistry. 98 (2018) 121-126. doi: 10.1016/j.apgeochem.2018.08.012.
[80] F. M. Michel, J. D. Rimstidt, K. Kletetschka, 3D printed mixed flow reactor for geochemical rate measurements, Appl. Geochemistry. 89 (2018) 86-91. doi: 10.1016/j.apgeochem.2017.11.008.
[81] K. D. Ralston, N. Birbilis, M. K. Cavanaugh, M. Weyland, B. C. Muddle, R. K. W. Marceau, Role of nanostructure in pitting of Al—Cu—Mg alloys, Electrochim. Acta. 55 (2010) 7834-7842. doi:https://doi.org/10.1016/j.electacta.2010.02.001.
[82] K. Ogle, S. Weber, Anodic dissolution of 304 stainless steel using atomic emission spectroelectrochemistry, J. Electrochem. Soc. 147 (2000) 1770-1780. doi: 10.1149/1.1393433.
[83] K. Ogle, Atomic emission spectroelectrochemistry: Real-time rate measurements of dissolution, corrosion, and passivation, Corrosion. 75 (2019) 1398-1419. doi: 10.5006/3336.
[84] G. J. Tearney, R. H. Webb, B. E. Bouma, Spectrally encoded confocal microscopy, Opt. Lett. 23 (1998) 1152-1154.
[85] D. Yelin, W. M. White, J. T. Motz, S. H. Yun, B. E. Bouma, G. J. Tearney, Spectral-domain spectrally-encoded endoscopy, Opt. Express. 15 (2007) 2432-2444.
[86] L. Froehly, S. N. Martin, T. Lasser, C. Depeursinge, F. Lang, Multiplexed 3D imaging using wavelength encoded spectral interferometry: a proof of principle, Opt. Commun. 222 (2003) 127-136.
[87] L. Golan, D. Yeheskely-Hayon, L. Minai, D. Yelin, High-speed interferometric spectrally encoded flow cytometry, Opt. Lett. 37 (2012) 5154-5156.
[88] J. G. Brunner, J. May, H. W. Hoppel, M. Göken, S. Virtanen, Localized corrosion of ultrafine-grained Al—

Mg model alloys, Electrochim. Acta. 55 (2010) 1966-1970. doi:https://doi.org/10.1016/j.electacta.2009.11.016.
[89] J. G. Brunner, N. Birbilis, K. D. Ralston, S. Virtanen, Impact of ultrafine-grained microstructure on the corrosion of aluminium alloy AA2024, Corros. Sci. 57 (2012) 209-214. doi:https://doi.org/10.1016/j.corsci.2011.12.016.
[90] W. APHA AWWA, Standard methods for the examination of water and wastewater 20th edition, Am. Public Heal. Assoc. Am. Water Work Assoc. Water Environ. Fed. Washington, D C. (1998).
[91] O. Gharbi, D. Jiang, D. R. Feenstra, S. K. Kairy, Y. Wu, C. R. Hutchinson, N. Birbilis, On the corrosion of additively manufactured aluminium alloy AA2024 prepared by selective laser melting, Corros. Sci. 143 (2018) 93-106.
[92] N. Homazava, A. Ulrich, M. Trottmann, U. Krähenbühl, Micro-capillary system coupled to ICP-M S as a novel technique for investigation of micro-corrosion processes, J. Anal. At. Spectrom. 22 (2007) 1122-1130. doi:https://doi.org/10.1039/B705248K.
[93] T. Hashimoto, X. Zhang, X. Zhou, P. Skeldon, S. Haigh, G. E. Thompson, Investigation of dealloying of S phase (A12CuMg) in A A 2024-T3 aluminium alloy using high resolution 2D and 3D electron imaging, Corros. Sci. 103 (2016) 157-164. doi:https://doi.org/10.1016/j.corsci.2015.11.013.
[94] X. Zhang, X. Zhou, T. Hashimoto, B. Liu, Localized corrosion in AA2024-T351 aluminium alloy: Transition from intergranular corrosion to crystallographic pitting, Mater. Charact. 130 (2017) 230-236. doi:https://doi.org/10.1016/j.matchar.2017.06.022.
[95] B. Gutmann, H. Weber, Phase unwrapping with the branch-cut method: role of phase-field direction, Appl. Opt. 39 (2000) 4802-4816. doi:https://doi.org/10.1364/AO.39.004802.
[95] C. Fischer, S. Finkeldei, F. Brandt, D. Bosbach, A. Luttge, Direct measurement of surface dissolution rates in potential nuclear waste forms: The example of pyrochlore, ACS Appl. Mater. Interfaces. 7 (2015) 17857-17865. doi: 10.1021/acsami.5b04281.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A fluid cell, comprising:
a chamber wall defining in part a fluid chamber, a fluid inlet, a fluid outlet, and an electrode opening for receiving an electrode;
a platform, at least a portion of which is positioned within the fluid chamber, the platform having a first surface for positioning a sample; and
a moveable transparent window positioned opposite the platform, the moveable window configured to move towards or away from the first surface of the platform, the moveable window defining in part the fluid chamber.

2. The fluid cell of claim 1, the chamber wall further defining a camera opening for accommodating a camera.

3. The fluid cell of claim 1, wherein
the fluid inlet is positioned opposite the fluid outlet, and the platform is positioned between the fluid inlet and the fluid outlet.

4. The fluid cell of claim 1, further comprising:
an inlet channel, one end of which terminates at the fluid inlet; and
an outlet channel, one end of which terminates at the fluid outlet.

5. The fluid cell of claim 1, wherein the moveable optical window includes a transparent flexible film coupled with a periphery of the chamber wall, the transparent flexible film including a polymer film.

6. The fluid cell of claim 1, wherein the moveable optical window includes a rigid portion and a flexible portion coupled with the rigid portion, the flexible portion further coupled with a periphery of the chamber wall.

7. The fluid cell of claim 1, wherein the moveable transparent window moves towards or away from the first surface of the platform responsive to a force imparted by an objective lens housing.

8. The fluid cell of claim 1, wherein the moveable transparent window has a refractive index that is within about 1-15% of a refractive index of a fluid within the fluid chamber.

9. The fluid cell of claim 1, further comprising:
an electrode channel, one end of which terminates at the electrode opening.

10. The fluid cell of claim 9, wherein the electrode opening is a first electrode opening, the electrode is a first electrode, and the electrode channel is first electrode channel, the fluid cell further comprising:
the chamber wall further defining a second electrode opening for receiving a second electrode; and
a second electrode channel, one end of which terminates at the second electrode opening.

11. The fluid cell of claim 1, further comprising:
a vibration motor positioned on a second surface of the platform, the second surface of the platform positioned outside of the fluid chamber.

12. The fluid cell of claim 1, wherein the platform includes a conduit that accommodates a sample electrode electrically coupled with the sample.

13. A fluid cell, comprising:
a chamber wall defining in part a fluid chamber, a fluid inlet and a fluid outlet;
a platform, at least a portion of which is positioned within the fluid chamber, the platform having a first surface for positioning a sample; and
a moveable transparent window positioned opposite the platform, the moveable window configured to move towards or away from the first surface of the platform, the moveable window defining in part the fluid chamber.

14. The fluid cell of claim 13, the chamber wall further defining a camera opening for accommodating a camera.

15. The fluid cell of claim 13, wherein the fluid inlet is positioned opposite the fluid outlet, and the platform is positioned between the fluid inlet and the fluid outlet.

16. The fluid cell of claim 13, further comprising:
an inlet channel, one end of which terminates at the fluid inlet; and
an outlet channel, one end of which terminates at the fluid outlet.

17. The fluid cell of claim 13, wherein the moveable optical window includes a transparent flexible film coupled with a periphery of the chamber wall, the transparent flexible film including a polymer film.

18. The fluid cell of claim 13, wherein the moveable optical window includes a rigid portion and a flexible portion coupled with the rigid portion, the flexible portion further coupled with a periphery of the chamber wall.

19. The fluid cell of claim 13, wherein the moveable transparent window moves towards or away from the first surface of the platform responsive to a force imparted by an objective lens housing.

20. The fluid cell of claim 13, wherein the moveable transparent window has a refractive index that is within about 1-15% of a refractive index of a fluid within the fluid chamber.

* * * * *